United States Patent
Genter et al.

[11] Patent Number: 6,109,129
[45] Date of Patent: Aug. 29, 2000

[54] APPARATUS AND METHOD FOR ADJUSTING A GEAR

[75] Inventors: David P. Genter, Kenilworth, United Kingdom; Eudell L. Kelly, Columbus, Ind.; Mark A. Voils, Columbus, Ind.; Thomas R. Stover, Columbus, Ind.; Robert W. Kolhouse, Columbus, Ind.

[73] Assignee: Cummins Engine Company, Inc., Columbus, Ind.

[21] Appl. No.: 09/186,238

[22] Filed: Nov. 4, 1998

Related U.S. Application Data

[63] Continuation-in-part of application No. 08/853,341, May 8, 1997, Pat. No. 5,870,928, and a continuation-in-part of application No. 08/853,013, May 8, 1997.

[51] Int. Cl.$^7$ .................................................. F16H 55/18
[52] U.S. Cl. .............................. 74/440; 74/397; 74/409
[58] Field of Search ............................. 74/397, 409, 440

[56] References Cited

U.S. PATENT DOCUMENTS

| | | | |
|---|---|---|---|
| 1,033,468 | 7/1912 | Raymond . | |
| 1,755,945 | 4/1930 | Alexandrescu . | |
| 2,147,027 | 2/1939 | Grier | 74/397 |
| 2,397,777 | 4/1946 | Colman | 74/409 |
| 2,436,746 | 2/1948 | Drought | 74/325 |
| 2,444,734 | 7/1948 | Gillett | 74/305 |
| 2,607,238 | 8/1952 | English et al. | 74/440 |
| 3,171,212 | 3/1965 | Michalec | 33/179.5 |
| 3,347,110 | 10/1967 | Wilson | 74/397 |
| 3,365,973 | 1/1968 | Henden | 74/409 |
| 3,397,589 | 8/1968 | Moore | 74/397 |
| 3,407,727 | 10/1968 | Fischer | 101/177 |
| 3,496,865 | 2/1970 | Fischer | 101/183 |
| 3,502,059 | 3/1970 | Davis et al. | 123/90 |
| 3,523,003 | 8/1970 | Hambric | 418/195 |
| 3,648,534 | 3/1972 | Fagarazzi | 74/440 |
| 4,380,991 | 4/1983 | Richter et al. | 125/20 |
| 4,422,344 | 12/1983 | Wutherich | 74/409 |
| 4,700,582 | 10/1987 | Bessette | 74/409 |
| 4,719,813 | 1/1988 | Chalik | 74/409 |
| 4,739,670 | 4/1988 | Tomita et al. | 74/409 |
| 4,747,321 | 5/1988 | Hannel | 74/440 |
| 4,770,054 | 9/1988 | Ha | 74/409 |
| 4,781,073 | 11/1988 | Bondhus et al. | 74/440 |
| 4,920,828 | 5/1990 | Kameda et al. | 475/299 |
| 4,953,417 | 9/1990 | Baumgarten et al. | 74/409 |
| 5,017,178 | 5/1991 | Krikke et al. | 464/7 |
| 5,056,613 | 10/1991 | Porter et al. | 180/178 |
| 5,119,687 | 6/1992 | Naruoka et al. | 74/479 |
| 5,146,804 | 9/1992 | Carmillet | 74/440 |
| 5,181,433 | 1/1993 | Ueno et al. | 74/409 |
| 5,492,029 | 2/1996 | Obrist | 74/409 |
| 5,540,112 | 7/1996 | Baker et al. | 74/409 |
| 5,685,197 | 11/1997 | Baker et al. | 74/409 |

FOREIGN PATENT DOCUMENTS

| | | |
|---|---|---|
| 651906 | 8/1994 | Australia . |
| 212567 | 8/1984 | Germany . |
| 95272 | 5/1985 | Japan . |
| WO93/00530 | 1/1993 | WIPO . |

OTHER PUBLICATIONS

18 Ways to Control Backlash in Gearing, Product Engineering, Oct. 26, 1989, pp. 71–75.

*Primary Examiner*—Allan D. Herrmann
*Attorney, Agent, or Firm*—Woodard, Emhardt, Naughton, Moriarty & McNett

[57] ABSTRACT

Apparatus and method for adjusting a gear in a gear train assembly. A first gear with a first rotational center and a second gear with a second rotational center are coupled to an engine. A third gear with a third rotational center is provided to form a first mesh with the first gear. The first mesh has a predetermined minimum backlash. The third gear also forms a second mesh with the second gear. The third gear includes an adjustable positioning mechanism which allows the rotational center of the third gear to be adjusted along a predetermined adjustment path that is substantially tangent to the first mesh. The adjustment mechanism of the third gear allows the minimum backlash of the first mesh to be maintained while the second mesh is adjusted to likewise achieve a generally minimized backlash.

21 Claims, 21 Drawing Sheets

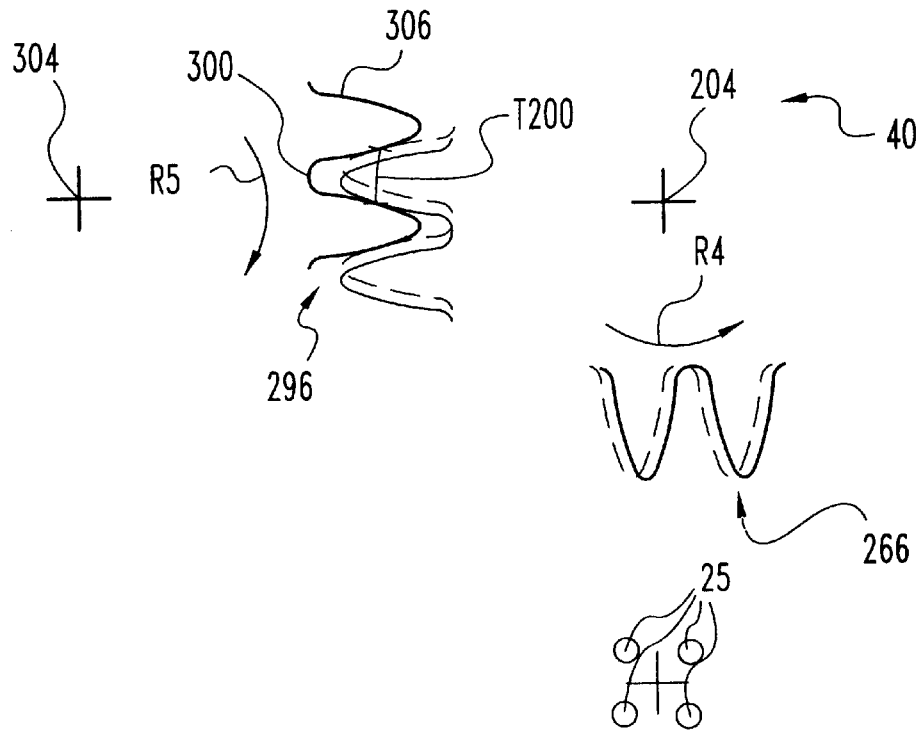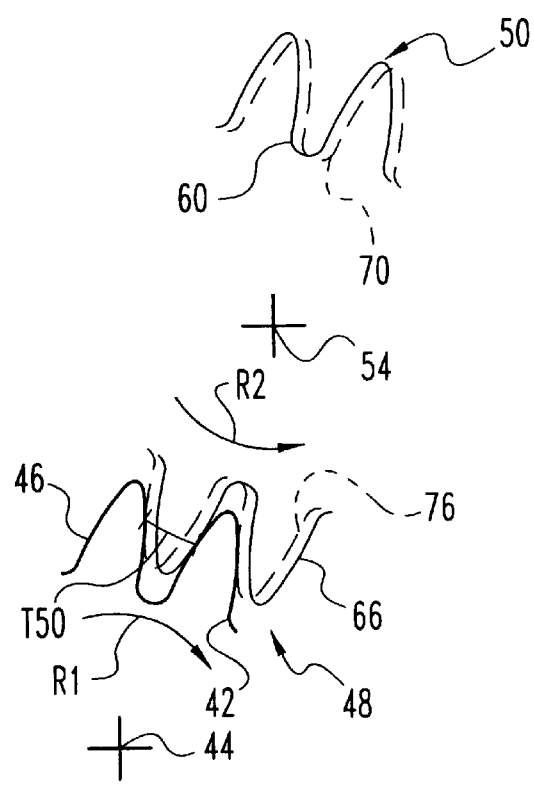
Fig. 7A

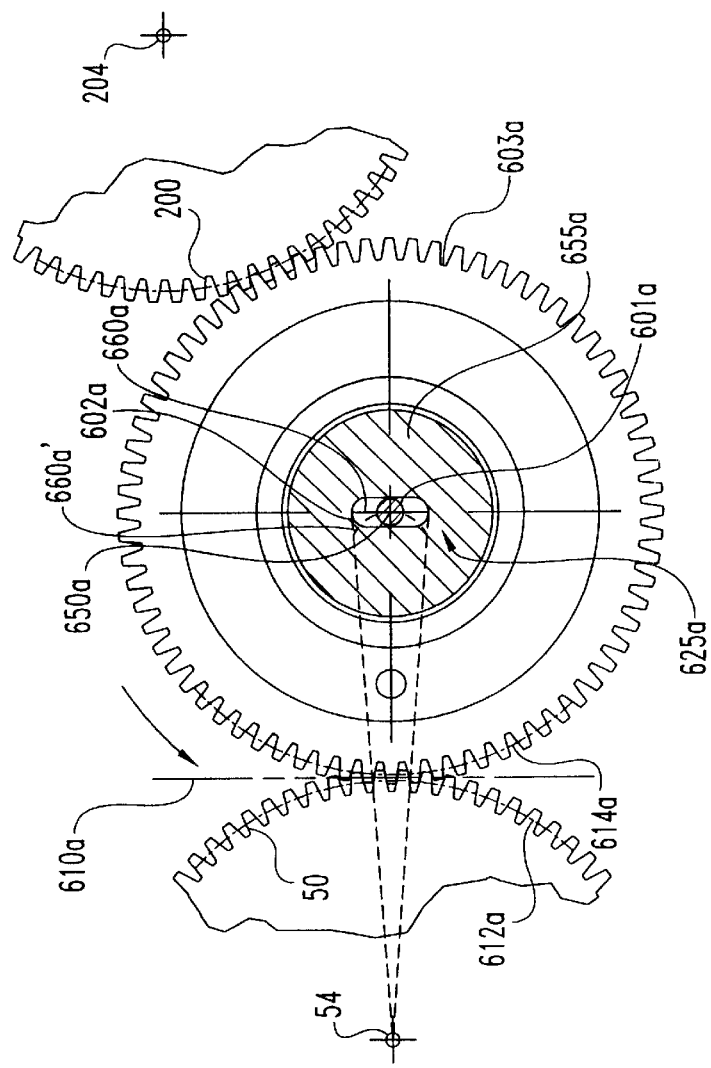
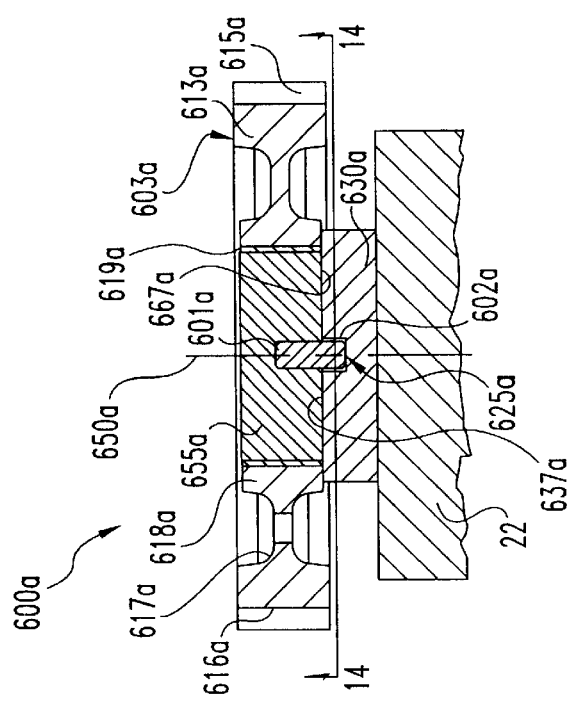
Fig. 14
Fig. 13

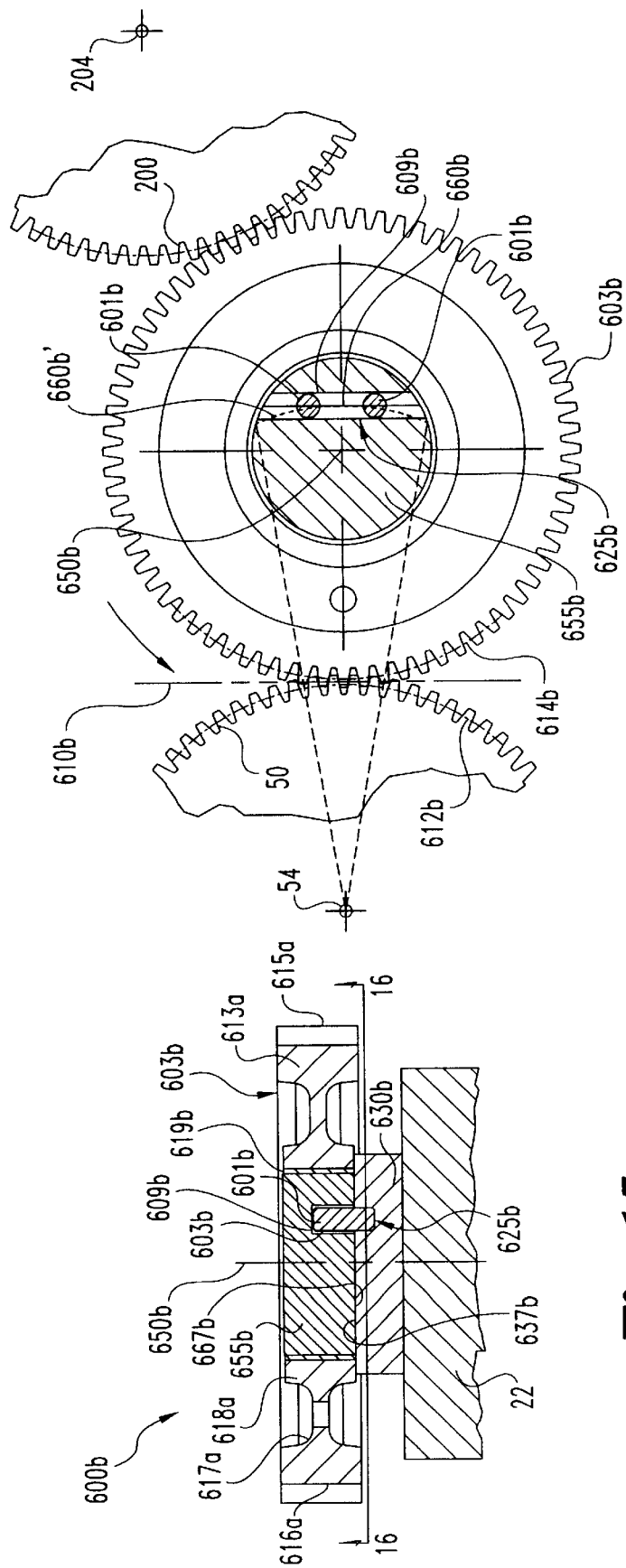

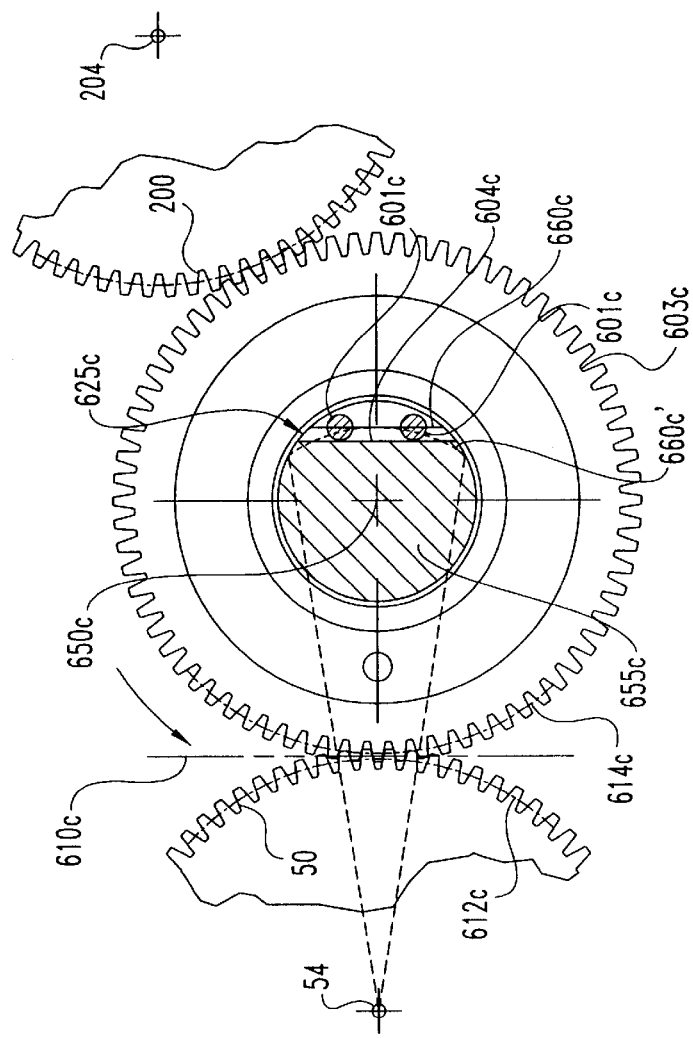
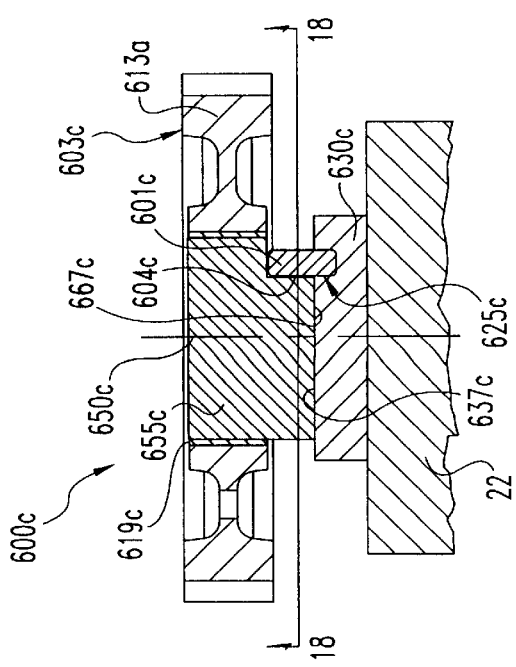
Fig. 18
Fig. 17

APPARATUS AND METHOD FOR ADJUSTING A GEAR

REFERENCE TO RELATED APPLICATIONS

This application is a continuation-in-part of U.S. patent application No. 08/853,341 entitled ANTI-LASH GEAR WITH ALIGNMENT DEVICE filed on May 8, 1997, now U.S. Pat. No. 5,870,928 and a continuation-in-part of U.S. patent application No. 08/853,013 entitled GEAR TRAIN ASSEMBLY INCLUDING SCISSOR GEAR filed on May 8, 1997. Additionally, this application is related to U.S. patent application No. 08/853,378 entitled ANTI-LASH GEAR ASSEMBLY filed on May 8, 1997.

BACKGROUND OF THE INVENTION

The present invention relates to gears, and more particularly, but not exclusively, relates to reduction of backlash in gear trains.

When the tooth of one gear mates with the gap of another gear, the gap typically provides more space than needed to accommodate the tooth. This excess space is sometimes called "lash" or "backlash." Backlash may vary with a number of factors including radial play in the gear bearings, gear shaft eccentricity, incorrect center-to-center spacing of the gears, and the gear-to-gear variation typical of many gear manufacturing processes.

The extra space associated with backlash usually leads to significant impact loading of the gear teeth. This loading often causes excessive noise and may result in other gear train problems. For example, backlash may accelerate gear wear. Backlash reduction is of particular concern for internal combustion engine applications—especially for gear trains used with diesel engines. U.S. Pat. No. 5,450,112 to Baker et al., U.S. Pat. No. 4,920,828 to Kameda et al., U.S. Pat. No. 4,700,582 to Bessette, and U.S. Pat. No. 3,523,003 to Hambric are cited as sources of background information concerning the application of gear trains to various engines.

One way to reduce backlash is through precision machining and mounting of the gears. However, this approach is usually expensive and still may not adequately address backlash that changes over time due to wear. Another approach to reduce backlash has been the introduction of one or more scissor gears into the gear train. Generally, scissor gears have teeth which adjust in size to occupy the space available between teeth of a mating gear. U.S. Pat. No. 5,056,613 to Porter et al., U.S. Pat. No. 4,747,321 to Hannel, U.S. Pat. No. 4,739,670 to Tomita et al., U.S. Pat. No. 3,365,973 to Henden, and U.S. Pat. No. 2,607,238 English et al. are cited as examples of various types of scissor gears.

Backlash accommodation with a scissor gear is often limited when the scissor gear is meshed with two or more gears having different amounts of lash. Typically, the mating gear having the smallest amount of lash dictates the effective tooth size of the scissor gear; however, this size is generally inadequate to take-up the greater lash of the other mating gear or gears. One potential solution to this problem is to select mating gears which minimize the lash difference, but this "lash matching" approach is typically expensive and time-consuming. Consequently, a need remains for a gear train assembly which accommodates lash differences resulting from multiple gears meshing with a scissor gear.

One scissor gear configuration has two toothed wheels spring-biased to rotate relative to each other about a common center. For this configuration, paired gear teeth, one from each wheel, spread to occupy the available space between teeth in a mating gear. In some gear trains, loading of the tooth pairs by the mating gear becomes high enough to align each tooth pair in opposition to the spring bias. Typically, each member of the aligned pair is configured to proportionally bear this high load by being sized with the same nominal thickness. However, it has been found that random deviations from nominal are usually enough to cause one tooth or the other of each pair to bear a disproportionately high amount of the load until it has deformed enough to match the other tooth. This deformation process often subjects the gear teeth to reverse bending loads that more quickly wear-out the teeth compared to teeth subjected to unidirectional bending loads. Also, such deformation may cause greater tooth-to-tooth variation, resulting in poorer performance and a more noisy gear train. Therefore, a need exists for an anti-lash gear assembly which accommodates high loading without these drawbacks.

It has also been discovered that the knocking of heavy duty diesel engines, often attributed to combustion processes, results, at least in part, from high impact gear tooth noise. Typically, this noise is not sufficiently abated by conventional scissor gear configurations. Thus, a gear train is also in demand which addresses this type of noise.

SUMMARY OF THE INVENTION

The present invention relates to anti-lash gear assemblies and gear trains utilizing one or more anti-lash gear assemblies. Various aspects of the invention are novel, nonobvious, and provide various advantages. While the actual nature of the invention covered herein can only be determined with reference to the claims appended hereto, certain forms of the invention that are characteristic of the preferred embodiments disclosed herein are described briefly as follows.

One form of the present invention is a gear train having a first gear forming a first mesh with a second gear and a second mesh with a third scissor gear. A mounting position of the first gear relative to the second and third gears is selected to maintain backlash of both the first and second meshes at or below a maximum acceptable level.

In an another form, an idler gear forms a first mesh with a first scissor gear to establish an effective tooth size of the first scissor gear. After the first mesh is established, the mounting position of the idler gear is selected. This mounting position is determined as a function of the effective tooth size to control backlash of a second mesh formed between the idler gear and a second scissor gear.

In a further form, an idler gear forms a first mesh with a first gear and a second mesh with a second gear. A mounting position of the idler gear relative to the first and second gears is selected to maintain backlash of both the first and second meshes at or below a maximum acceptable level. This mounting position may be selected by using a mechanism that constrains movement of the idler gear along a desired path and the first gear, second gear, or both may be of a scissor type configuration.

In an additional form of the present invention, a gear train assembly for an engine is provided which includes a first scissor gear rotatably coupled to the engine, the first scissor gear having a first rotational center; a second scissor gear rotatably coupled to the engine, the second scissor gear having a second rotational center; and an idler gear rotatably coupled to the engine to form a first mesh with the first scissor gear and a second mesh with the second scissor gear. The idler gear has a third rotational center and is mounted by a positioning mechanism having a guide member slidingly engaging a generally linear adjustment path, the idler gear being selectively positionable along the path to maintain a distance between the first and third rotational centers within a predetermined range corresponding to a generally minimized backlash for the first mesh, and to provide a correspondingly adjustable separation distance range between the second and third rotational centers to generally match backlash of the second mesh to the minimized backlash of the first mesh.

In yet another form of the present invention, a method of assembling a gear train includes: (a) mounting a first gear which defines a first rotational center; (b) mounting a second gear which defines a second rotational center; and (c) mounting a third gear defining a third rotational center to establish a first mesh of a generally minimized backlash with the first gear and a second mesh with the second gear, the third gear being adjustable about a generally linear adjustment path, the linear adjustment path having a predetermined relationship to a tangent formed by the first mesh, whereby the third gear is selectively positionable along the adjustment path to minimize a backlash of the second mesh while maintaining the generally minimized backlash of the first mesh.

In still another form of the present invention, a gear train assembly for an engine includes a first gear rotatably coupled to the engine, the first gear having a first rotational center; a second gear rotatably coupled to the engine, the second gear having a second rotational center; and an idler gear rotatably coupled to the engine to form a first mesh with the first gear and a second mesh with the second gear. The idler gear defines a third rotational center and includes means for positioning the third gear along a generally linear adjustment path, the idler gear being selectively positionable along the path to maintain a distance between the first and third rotational centers within a predetermined range corresponding to a generally minimized backlash for the first mesh and to provide a correspondingly adjustable separation distance range between the second and third rotational centers to generally match backlash of the second mesh to the minimized backlash of said first mesh.

Other forms of the present invention include incorporating the various anti-lash gear assemblies of the present invention into a gear train and utilizing the adjustable positioning mechanisms of the present invention with an internal combustion engine.

It one object of the present invention to reduce noise emitted by engine gear trains.

Another object of the present invention is to provide an anti-lash gear assembly which reduces gear train noise emissions.

It is another object of the present invention to control load sharing between multiple gear wheels of a scissor gear assembly.

Yet another object is to provide a reliable technique for adjusting gear assemblies to reduce backlash.

Further objects, features, advantages, benefits and aspects of the present invention will become apparent from the drawings and description contained herein.

BRIEF DESCRIPTION OF THE DRAWINGS

FIGS. 7A and 7B are schematic, front elevational views of the system of FIG. 1 at various stages of assembly.

FIG. 13 is a section view of a second embodiment of an idler gear adjustment mechanism of the present invention.

FIG. 14 is a cross-sectional view of the gear adjustment mechanism of FIG. 13 taken through section line 14—14.

FIG. 15 is a section view of a third embodiment of a gear adjustment mechanism of the present invention.

FIG. 16 is a cross-sectional view of the gear adjustment mechanism of FIG. 15 taken through section line 16—16.

FIG. 17 is a section view of a fourth embodiment of a gear adjustment mechanism of the present invention.

FIG. 18 is a cross-sectional view of the gear adjustment mechanism of FIG. 17 taken through section line 18—18.

DESCRIPTION OF THE PREFERRED EMBODIMENTS

Figure 1:
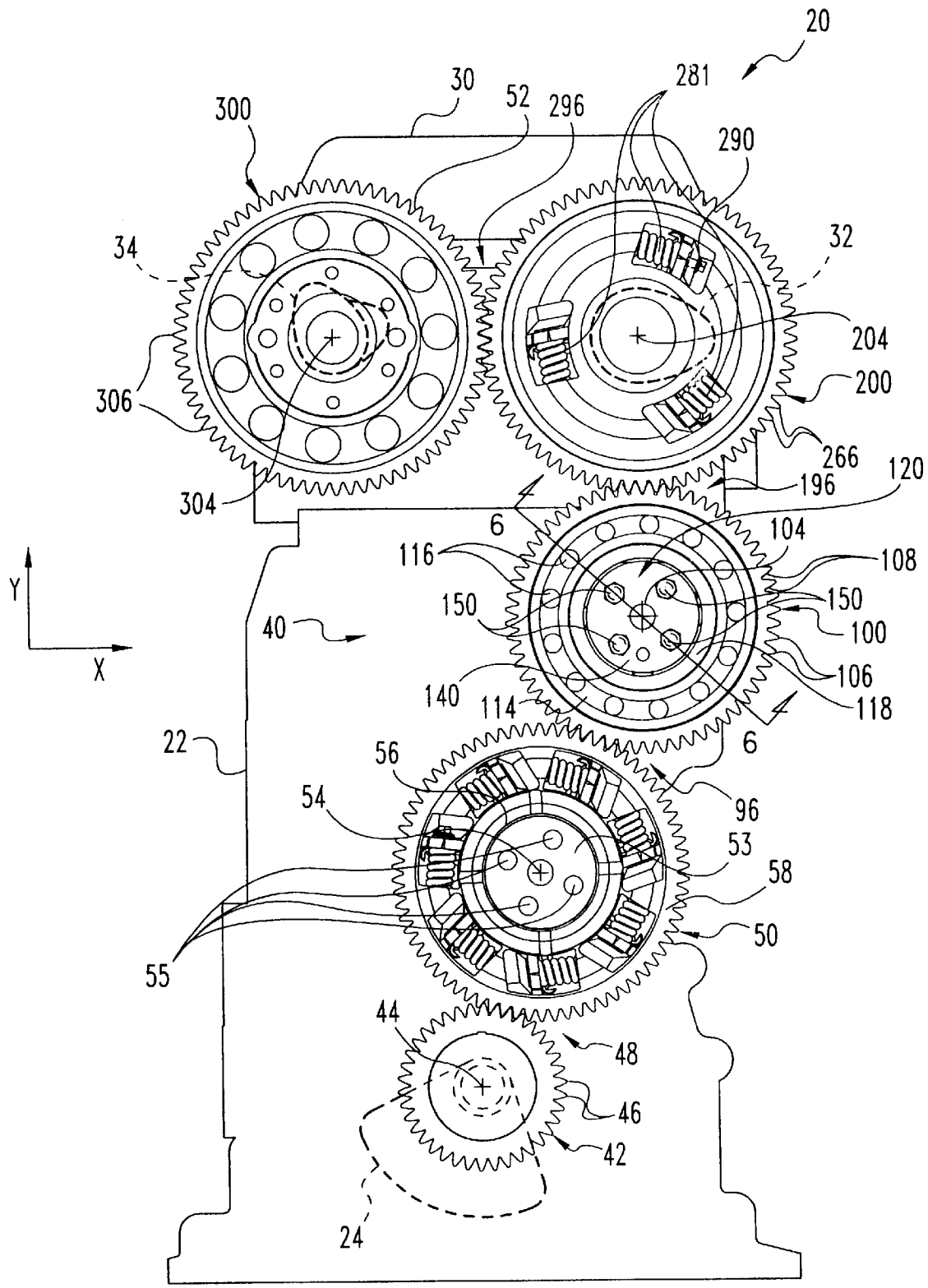
FIG. 1 is a front elevational view of an internal combustion engine system of one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 depicts internal combustion engine system 20 of the present invention. System 20 includes engine block 22 with a crankshaft 24 shown in phantom. Engine system 20 also includes head assembly 30 connected to block 22. Head assembly 30 includes fuel injector camshaft 32 shown in phantom and valve camshaft 34 shown in phantom. In one embodiment, block 22 and head assembly 30 are configured as a heavy duty, in-line six cylinder diesel engine. The present invention is also applicable to other types of engines as would occur to one skilled in the art.

System 20 includes timing gear train 40. Gear train 40 includes drive gear 42 connected to crankshaft 24. Crankshaft 24 and drive gear 42 have rotational center 44 at the intersection of the crosshairs designated by reference numeral 44. For the figures referenced herein, centers of rotation are depicted by a broken line segment indicative of the corresponding rotational axis when the rotational axis is not perpendicular to the view plane and by crosshairs when the rotational axis is perpendicular to the view plane. Gear 42 rotates with crankshaft 24 during operation of engine system 20 about center 44 to drive the remaining gears of gear train 40.

Gear 42 has teeth 46 which form mesh 48 with lower idler anti-lash gear 50. Gear 50 rotates about shaft 53 having rotational center 54. Shaft 53 is mounted to block 22 by fasteners 55. Bearing 56 provides a rotational bearing relationship between anti-lash gear assembly 58 of gear 50 and shaft 53.

Figure 2:
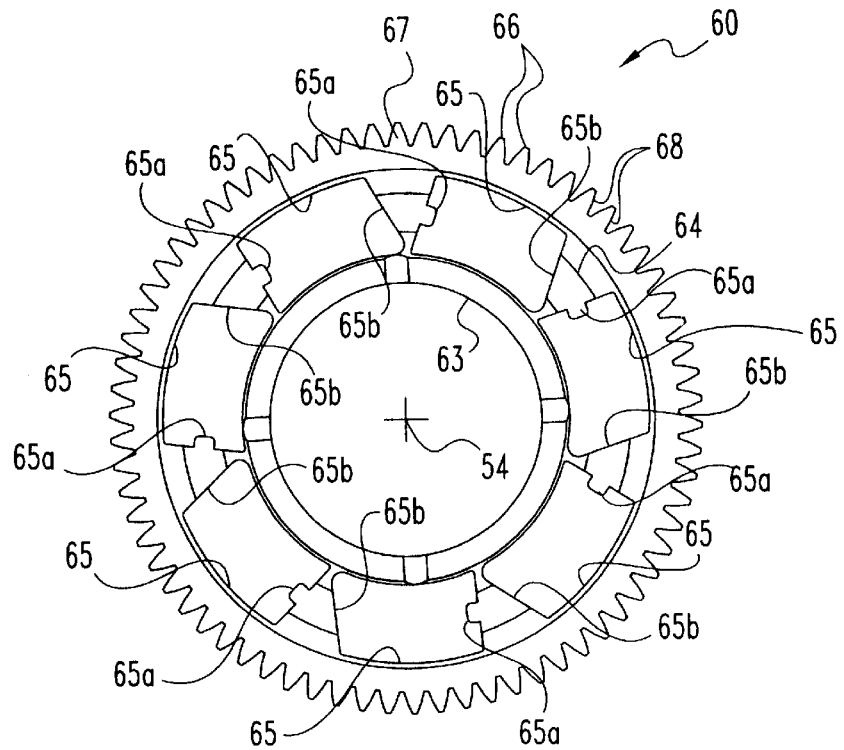
FIGS. 2 and 3 are top plan views of components of an anti-lash gear assembly for the embodiment of FIG. 1.

FIGS. 2–5 provide additional details concerning the structure and operation of anti-lash gear assembly 58 of gear 50. Referring to FIG. 2, various details of gear wheel 60 prior to incorporation into gear assembly 58 are shown. Gear wheel 60 includes a hub 63. Web 64 defines seven circumferentially spaced apart apertures 65. Furthermore, for each aperture 65, web 64 defines a fingered edge 65a at one end opposing edge 65b at another end. Aperture 65 and edges 65a, 65b are generally evenly spaced along the circumference of an imaginary circle about center 54. Gear wheel 60 includes a number of circumferentially spaced-apart gear teeth 66 defined by rim 67. Rim 67 is integrally connected to hub 63 by web 64. Adjacent members of gear teeth 66 are generally evenly spaced-apart from one another by gaps 68. Only a few of teeth 66 and gaps 68 are designated to preserve clarity. Each member of gear teeth 66 is generally sized and shaped the same as the others. Similarly, each gap 68 generally has the same size and shape.

Figure 3:
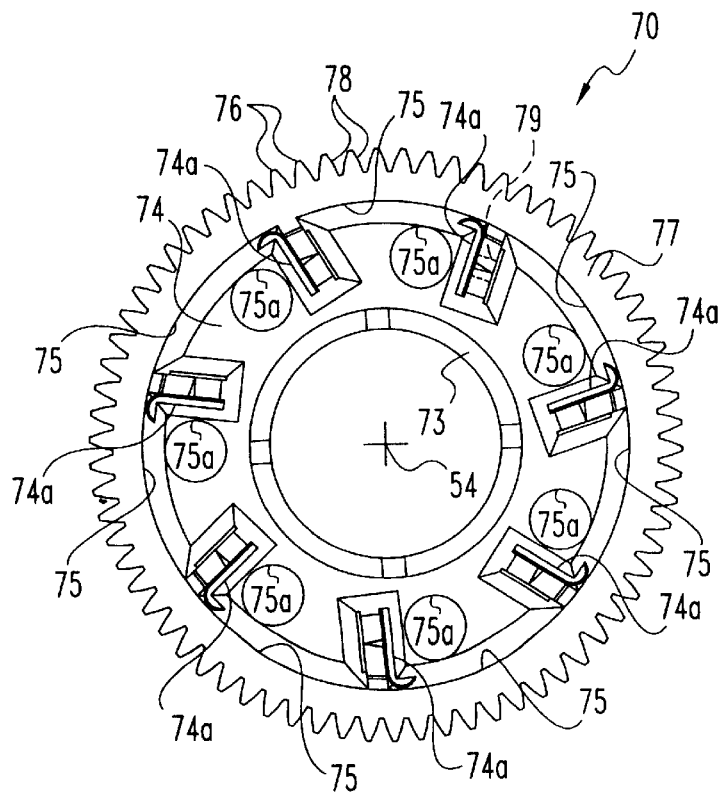

Referring to FIG. 3, gear wheel 70 of anti-lash assembly 58 is illustrated. Gear wheel 70 includes hub 73 which is configured to form a rotary bearing relationship with shaft 53 via bearing 56 (see FIG. 1). Hub 63 of gear wheel 60 engages hub 73. The interface between hubs 63 and 73 is adapted to permit rotation of gear wheels 60 and 70 relative to each other. Gear wheel 70 also includes web 74. Tabs 74a project from web 74 in a direction generally perpendicular to the view plane of FIG. 3 and have one side connected to rim 77 to define corresponding recesses 75. At least one tab 74a defines threaded bore 79 therethrough. Bore 79 has a longitudinal axis generally parallel to the view plane of FIG. 3. Web 74 also defines lightening holes 75a each corresponding to one of recesses 75. Tabs 74a and recesses 75 are generally evenly spaced along the circumference of an imaginary circle about center 54.

Wheel 70 includes a number of gear teeth 76 defined by rim 77. Rim 77 is integrally connected to hub 73 by web 74. Adjacent members of gear teeth 76 are generally evenly spaced-apart from one another by gaps 78. Only a few of teeth 76 and gaps 78 are designated to preserve clarity. Each member of gear teeth 76 is generally sized and shaped the same as the others. Similarly each gap 78 generally has the same shape and size. Preferably, the number of teeth 76 of wheel 70 is the same as the number of teeth 66 of wheel 60.

Figure 4:
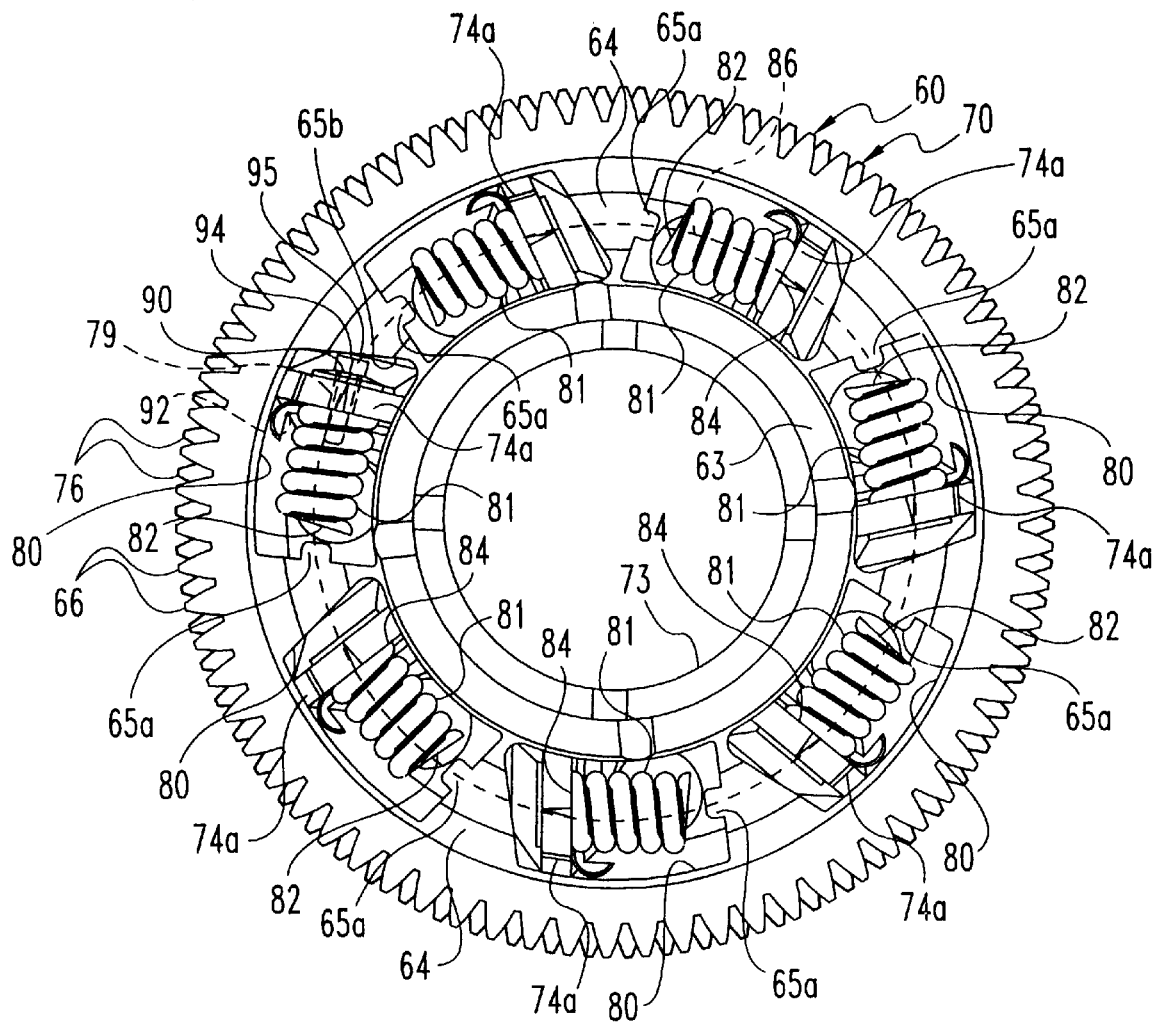
FIG. 4 is a top plan view of the components of FIGS. 2 and 3 incorporated into the anti-lash gear assembly in an unaligned configuration.

FIG. 4 defines anti-lash gear assembly 58 in an unaligned configuration commonly encountered prior to preparation for installation in gear train 40. In this configuration, wheels 60 and 70 loosely engage each other so that each aperture 65 of wheel 60 generally overlaps a corresponding recess 75 of wheel 70 to define a number of pockets 80. A number of coil springs 81 are provided each having end 82 opposite end 84. Each spring 81 is positioned in a corresponding one of pockets 80 with end 82 engaging a corresponding tab 74a and end 84 aligning with a corresponding edge 65a. However, ends 84 do not typically engage edges 65a in this configuration.

Assembly 58 also includes adjustment bolt 90 having threaded stem 92 opposing head 94. Stem 92 is shown fully threaded into bore 79 in FIG. 4 with head 94 in contact with corresponding tab 74a. By convention, teeth 66 and 76 are in an "unaligned" position such that teeth 66 overlap gaps 78 defined between teeth 76, and teeth 76 overlap gaps 68 defined between teeth 66. Hub 73 of wheel 70 forms a rotary bearing relationship with hub 63 of wheel 60 so that wheels 60 and 70 are permitted to rotate relative to one another. Head 94 defines contact surface 95 configured to bear against adjacent edge 65b of wheel 60 when wheel 60 is rotated counter-clockwise relative to wheel 70. When wheel 60 is rotated in the to clockwise direction relative to wheel 70, spring ends 84 eventually engage corresponding edges 65a. Preferably, each edge 65a defines a finger sized to fit inside the coil of each spring 81 to facilitate proper alignment with wheel 60. When rotated in the clockwise direction with sufficient force, springs 81 are compressed between corresponding edges 65a and tabs 74a, as illustrated in FIG. 5.

Figure 5:
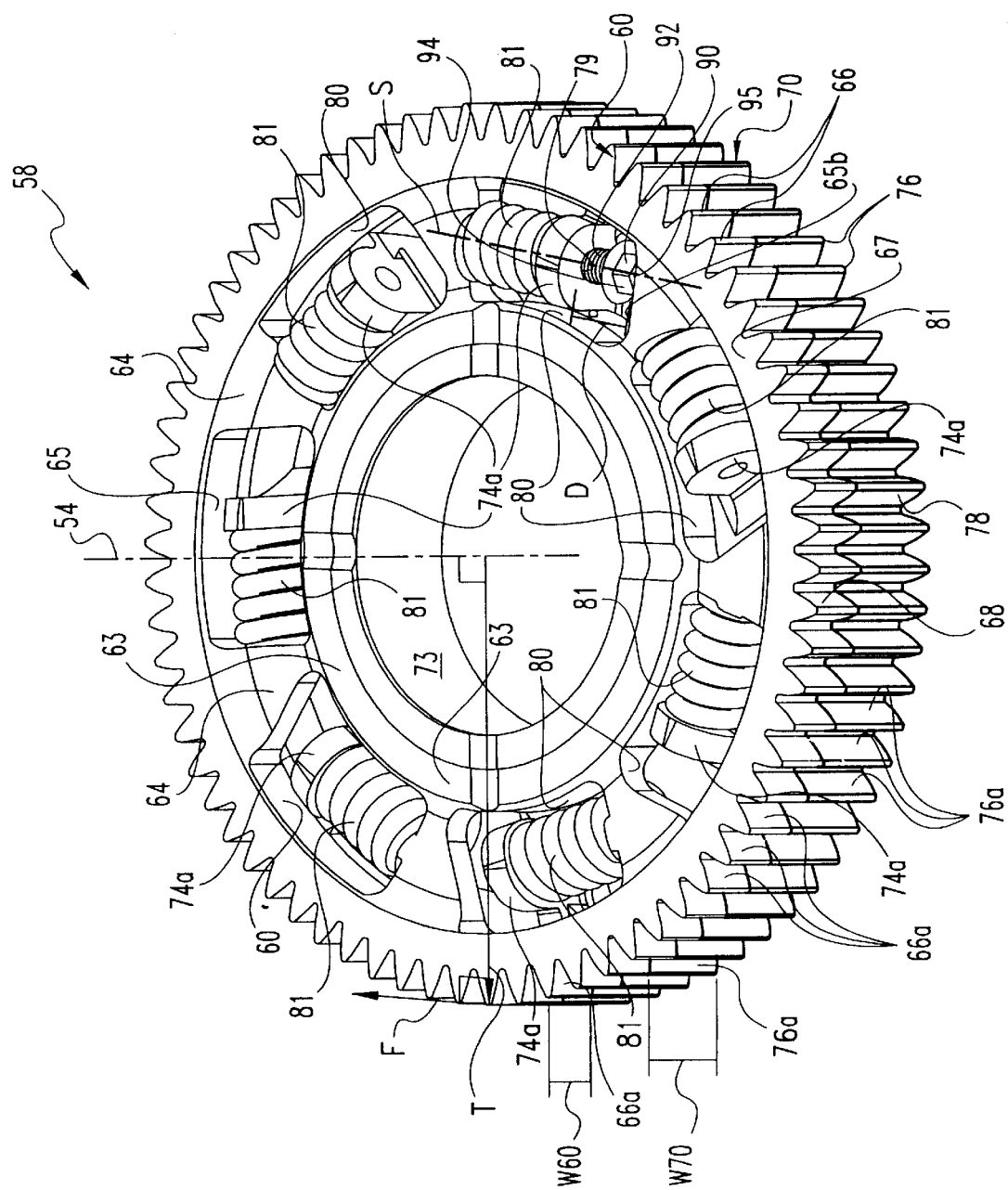
FIG. 5 is a perspective view of the anti-lash gear assembly of FIG. 4 in an aligned configuration.

FIG. 5 depicts an "aligned" position of gear wheel 60 and 70 reflecting a configuration suitable for installation in gear train 40. When aligned, teeth 76 and 66 are approximately centered over one another as depicted in FIG. 5. Springs 81 are also in a highly compressed condition between edges 65a and tabs 74a to provide a correspondingly high spring force. Adjusting assembly 58 from the configuration of FIG. 4 to the configuration of FIG. 5 is provided by unthreading bolt 90 so that head 94 moves away from bore 79 along stem axis S. As this unthreading continues, surface 95 bears against adjacent edge 65b and springs 81 are compressed between adjacent aligned tabs 74a and edges 65a.

Unthreading of bolt 90 spreads apart the associated tab 74a and edge 65b to rotate wheels 60 and 70 rotate relative to one another and move teeth 66 and 76 past each other. A given tooth of wheel 66 may move into and out of registration with several teeth 76 before reaching the highly biased configuration of FIG. 5 from the unbiased configuration of FIG. 4.

FIG. 5 also depicts face 66a of each tooth 66 of wheel 60 a few of which are depicted. Each tooth 76 of wheel 70 similarly has a face 76a, a few of which are depicted. Width W60 represents the width of a typical face 66a. Similarly, width W70 represents the width of a typical face 76a. Preferably, width W60 is less than width W70. More preferably, width W70 is at least about 50% greater than width W60. Most preferably, width W70 is at least about twice width W60.

Referring collectively to FIGS. 4 and 5, anti-lash gear wheel assembly 58 is constructed by providing wheel 70 and mounting one of springs 81 to align with bore 79. Bolt 90 is threaded into bore 79 so that head 94 contacts the associated tab 74a. The remaining springs 81 are placed in recesses 75 of wheel 70. Wheel 60 is placed over wheel 70 to define corresponding pockets 80 generally evenly spaced along imaginary circle 86 (shown in phantom in FIG. 4). Edges 65a align with ends 84 of corresponding springs 81.

Prior to mounting assembly 58 on shaft 53, it is preferred that teeth 66 and 76 be aligned. To provide this alignment, bolt 90 is partially unthreaded from bore 79 so that head 94 contacts adjacent edge 65b of wheel 60 and correspondingly compresses springs 81. In response, teeth 66, 76 move past one another. Unthreading of bolt 90 continues this motion until the aligned position of FIG. 5 is generally reached. As a result, wheel 60 is separated from wheel 70 along stem axis S by distance D as illustrated in FIG. 5. Notably, a portion of stem 92 of bolt 90 remains threaded in bore 79 in both the unaligned position of FIG. 4 and in the aligned position of FIG. 5. In other embodiments, more than one or all of tabs 74a may be adapted to define a bore 79 suitable for engagement by bolt 90. Similarly, multiple bolts 90 may be employed with embodiments having multiple bores 79.

Once teeth 66 and 76 are aligned in the configuration of FIG. 5, assembly 58 is mounted to shaft 53 via bearing 56. When so mounted, the aligned teeth 66, 76 form mesh 48 with teeth 46 of drive gear 42. However, mesh 48 typically has a significant amount of lash when teeth 66, 76 are forcibly aligned by the extension of bolt 90. To take-up this lash with gear 50, wheels 60 and 70 are preferably permitted to rotate relative to one another under the influence of the bias provided by compressed springs 81. Threading bolt 90 back into bore 79 once assembly 58 is mounted to form mesh 48 with drive gear 42 permits this rotation. As a result, the spring bias offsets teeth 66 and 76 from one another to generally occupy the entire space between adjacent teeth 46 participating in mesh 48. Notably, mesh 48 does not permit teeth 66, 76 to return to the unloaded position of the FIG. 4 configuration.

Each pair of initially aligned teeth 66, 76 operate collectively as a composite tooth with a variable effective size or "thickness" dependent upon the space between mating teeth 46. By varying in thickness, these composite teeth may reduce, or even effectively eliminate, backlash in mesh 48. To conclude installation of assembly 58, bolt 90 should be tightened down so that head 94 bears against the associated tab 74a. Bolt 90 is preferably carried by wheel 70 throughout the adjustment process and utilization of assembly 58 as part of gear 50.

Preferably, wheel 60 and 70 are machined from a metallic material suitable for long-term use in a diesel engine timing gear train. It is also preferred that bolt 90 and springs 81 be selected from compatible materials suitable for long term use in a diesel engine environment. Nonetheless, in other embodiments, different materials may be used as would occur to one skilled in the art.

Although gear 50 is illustrated in FIG. 1 as an idler gear, in other configurations it may be configured as a driving gear, a driven gear, or otherwise adapted or modified as would occur to one skilled in the art. In all these forms, gear 50 may be considered to be a novel type of "scissor gear."

Referring back to FIG. 1, gear 50 participates in gear train 40 to form mesh 96 with idler gear 100. Idler gear 100 rotates about rotational center 104 and defines circumferential teeth 106 spaced apart by gaps 108 to form mesh 96 with gear 50.

Figure 6:
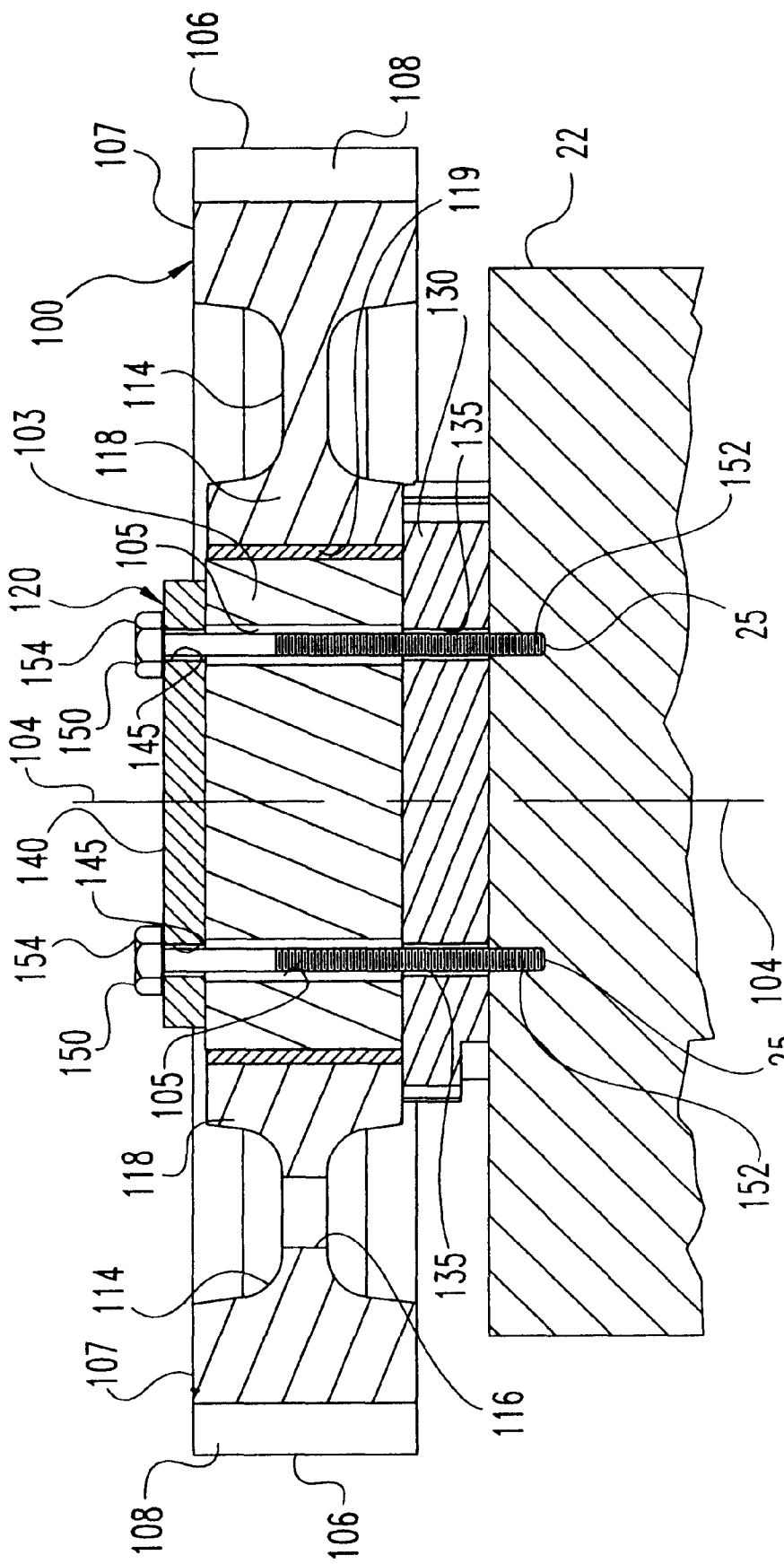
FIG. 6 is an cross-sectional view of an idler gear and adjustable positioning mechanism along section lines 6—6 of FIG. 1.

Referring additionally to FIG. 6, further details concerning idler gear 100 are provided. Idler gear 100 includes rim 107 defining teeth 106 integrally connected to web 114. Web 114 defines lightening holes 116. Web 114 is also integrally connected to hub 118 which, as shown in the cross-sectional view of FIG. 6, has slightly less thickness along the rotational axis corresponding to center 104 than rim 107. Cylindrical bushing 119 provides a rotational bearing surface between shaft 103 and hub 118. Shaft 103 defines four passages 105 used to mount idler gear 100 to block 22.

Mounting of idler gear 100 is provided by adjustable positioning mechanism 120. Mechanism 120 includes a mounting plate 130 which is positioned between shaft 103 of idler gear 100 and block 22. Notably, plate 130 is configured to provide clearance with hub 118 of idler gear 100 so that idler gear 100 may freely rotate about shaft 103.

Idler gear 100 and mounting plate 130 are positioned between block 22 and retaining plate 140. Retaining plate 140 includes mounting holes 145 which are generally aligned with mounting passages 105 of shaft 103, mounting passages 135 of plate 130, and threaded bores 25 of block 22. Notably passages 105 have a larger dimension along an axis perpendicular to the rotational axis of gear 100 than passages 135, holes 145, and bores 25. Idler gear 100 is secured between plates 130 and 140 by inserting cap screw fasteners 150 through holes 145, passages 105, and passages 135 and threading the end of threaded stems 152 into bores 25. Fasteners 150 each have head 154 opposing threaded stem 152. Head 154 is sized to contact retaining plate 140 when stems 152 are fully threaded into bores 25 to clamp plate 140 against shaft 153 and to clamp shaft 153 against plate 130.

In operation, mechanism 120 is configured to position idler gear 100 relative to a planar region that is preferably parallel to the view plane of FIG. 1 and perpendicular to the view plane of FIG. 6. Within this region, gear 100 may be positioned with two degrees of freedom as symbolized by the X and Y directional arrows of FIG. 1.

To mount idler gear 100, mounting plate 130 is first secured to block 22 using fasteners (not shown) in a conventional manner so that passages 135 align with bores 25. Once plate 130 is secured to block 122, idler gear 100 is located on plate 130 so that passages 105 overlap passages 135. Next, retaining plate 140 is placed over shaft 103 to locate holes 145 over corresponding passages 105 and 135, and bores 25. Fasteners 150 are then each placed through an aligned hole 145, passage 105, and passage 135 and loosely threaded into a corresponding bore 25. Preferably, fasteners 150 are initially threaded into bores 25 an amount sufficient to contact plate 140 and yieldingly hold idler gear 100 in position. In this configuration, the position of idler gear 100 relative to the planar region symbolized by the X and Y directional arrows may be selected within the range permitted by the clearance of fasteners 150 in passages 105. Once an X-Y position is selected, fasteners 150 are tightened down to secure idler gear 100 and mechanism 120.

Teeth 106 of idler gear 100 form mesh 196 with anti-lash gear 200. Gear 200 is mounted to fuel injector camshaft 32 of head assembly 30 and is configured to rotate about rotational center 204. Gear 200 is preferably configured similar to gear 50 having composite gear tooth pairs represented by reference numeral 266. Furthermore, springs 281 of gear 200 are shown configured in a manner similar to springs 81 of gear 50, although fewer in number (three being shown). Likewise an installation adjustment bolt 290 is shown. This adjustment bolt may function for installation purposes similar to bolt 90 of gear 50. Gear 50, gear 200, or both may utilize belleville washers to provide a spring bias either with or without coil springs.

Gear 200 forms mesh 296 with mating gear 300. Mating gear 300 is attached to valve camshaft 34 to rotate about rotational center 304. Gear 300 defines teeth 306 which interface with tooth pairs 266 of gear 200 to form mesh 296.

In operation, drive gear 42 rotates with crankshaft 24 to turn gear 50. In response, gear 50 turns idler gear 100 via mesh 96. Idler gear 100 drives gear 200 via mesh 196 to regulate timing of fuel injectors (not shown) for engine system 20 by rotating fuel injector camshaft 32. Furthermore, gear 200 drives mating gear 300 via mesh 296 to rotate valve camshaft 34 therewith to time engine valves (not shown) for head assembly 30. Thus, gear train 40 turns camshafts 32 and 34 of head assembly 30 in response to rotation of crankshaft 24 to control timing of engine system 20.

In other embodiments, different quantities and arrangements of gears in gear train 40 may be utilized as would occur to one skilled in the art. In one alternative embodiment, a conventional scissor gear may be used in place of gear 50, gear 200, or both. In still other embodiments an idler gear with an adjustable positioning mechanism may not be required.

In one embodiment of gear train 40, the number of teeth 46 is about 48 for drive gear 42; the number of teeth 66, 76 is about 70 for gear wheels 60, 70, respectively; the number of teeth 106 for adjustable idler gear 100 is about 64; the number of composite teeth 266 for gear 200 is about 76 and the number of teeth 306 is about 76 for gear 300. Furthermore, for this configuration, gears 42, 50, 100, 200, 300 are of a spur gear configuration, are made from metallic materials suitable for long term use with internal combustion engines, and have generally parallel rotational axes which perpendicularly intersect the view plane of FIG. 1.

Figure 7B:
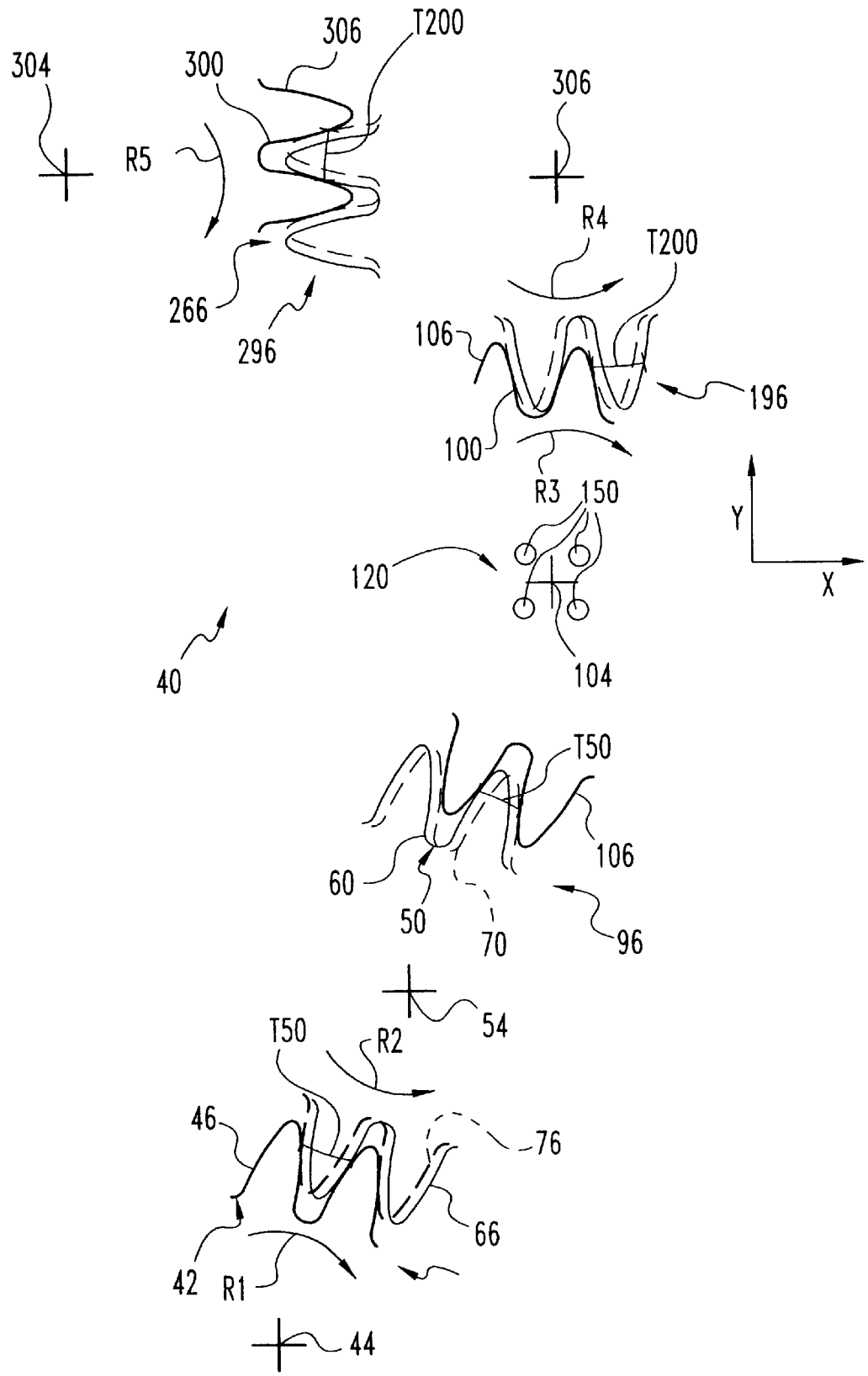

Having described selected structural and operational features of system 20, certain aspects concerning the assembly of system 20 are next described in connection with the schematic representations of FIGS. 7A and 7B. In FIGS. 7A and 7B, reference numerals schematically depict structure identified by like reference numerals in FIGS. 1–6; however, gear meshes have been enlarged to emphasize selected features of the present invention. FIG. 7A illustrates an intermediate assembly stage of drive train 40. In this stage, drive gear 42 has been previously mounted to rotate about center 44 in the direction indicated by arrow R1. Similarly, mating gear 300 has been mounted to rotate about center 304 in the direction indicated by arrow R5.

After gears 42 and 300 have been mounted, gears 50 and 200 are mounted to form mesh 48 between gears 42 and 50, and mesh 296 between gears 200 and 300. The formation of meshes 48, 296 determines the effective composite tooth size of corresponding pairs of teeth for gears 50 and 200 as they occupy gaps between teeth 46 and 306 of gears 42 and 300, respectively. For gear 50, teeth 76 of wheel 70 are represented by dashed lines, and teeth 66 of wheel 60 are represented by solid lines for illustrative purposes. The effective circular thickness T50 of one composite tooth pair of gear 50 is also shown. This composite circular thickness is determined along a pitch circle of gear 50 for mesh 48. Notably, in the absence of idler gear 100, thickness T50 is defined by the mating gap of teeth 46 of gear 42.

For mesh 296, gear 200 forms composite teeth pairs 266. Each pair 266 has a member represented by a dashed line and a member represented by a solid line to enhance clarity. The effective circular tooth thickness of one composite tooth pair 266 is shown as circular thickness T200 relative to a pitch circle for gear 200.

Arrows R4, R5 indicate the rotational direction in which gears 200, 300 are driven, respectively. Also indicated are mounting bores 25 of engine block 22 for reference.

Having defined the composite circular thicknesses T50 and T200, idler gear 100 is installed to form mesh 96 with gear 50 and mesh 196 with gear 200 as depicted in FIG. 7B. The tooth thicknesses T50 and T200 are typically different corresponding to a difference in the amount of backlash in meshes 48 and 296. By using mechanism 120 to adjust the X-Y position of rotational center 104 relative to fixed rotational centers 54 and 204, idler gear 100 may be located to optimally mesh with the pre-defined tooth sizes of gears 50 and 200 despite any lash difference. Fasteners 150 of mechanism 120 are illustrated in FIG. 7B for reference.

The positional adjustment of idler gear 100 relative to the other gears results in significant control over the amount of backlash in meshes 96 and 196. When the backlash difference resulting from different T50 and T200 widths is within a certain range, backlash may be reduced, or even effectively eliminated, through proper placement of idler gear 100 along a planar region perpendicular to the rotational axes of the meshing gears.

Notably, while the preferred embodiment presents two meshes 96, 196 with idler gear 100, in other embodiments this assembly method may be practiced to control backlash for a different quantity of meshing gears. For example, this assembly technique finds application in gear trains having only three gears oriented similar to gears 42, 50, and 100.

Figure 8A:
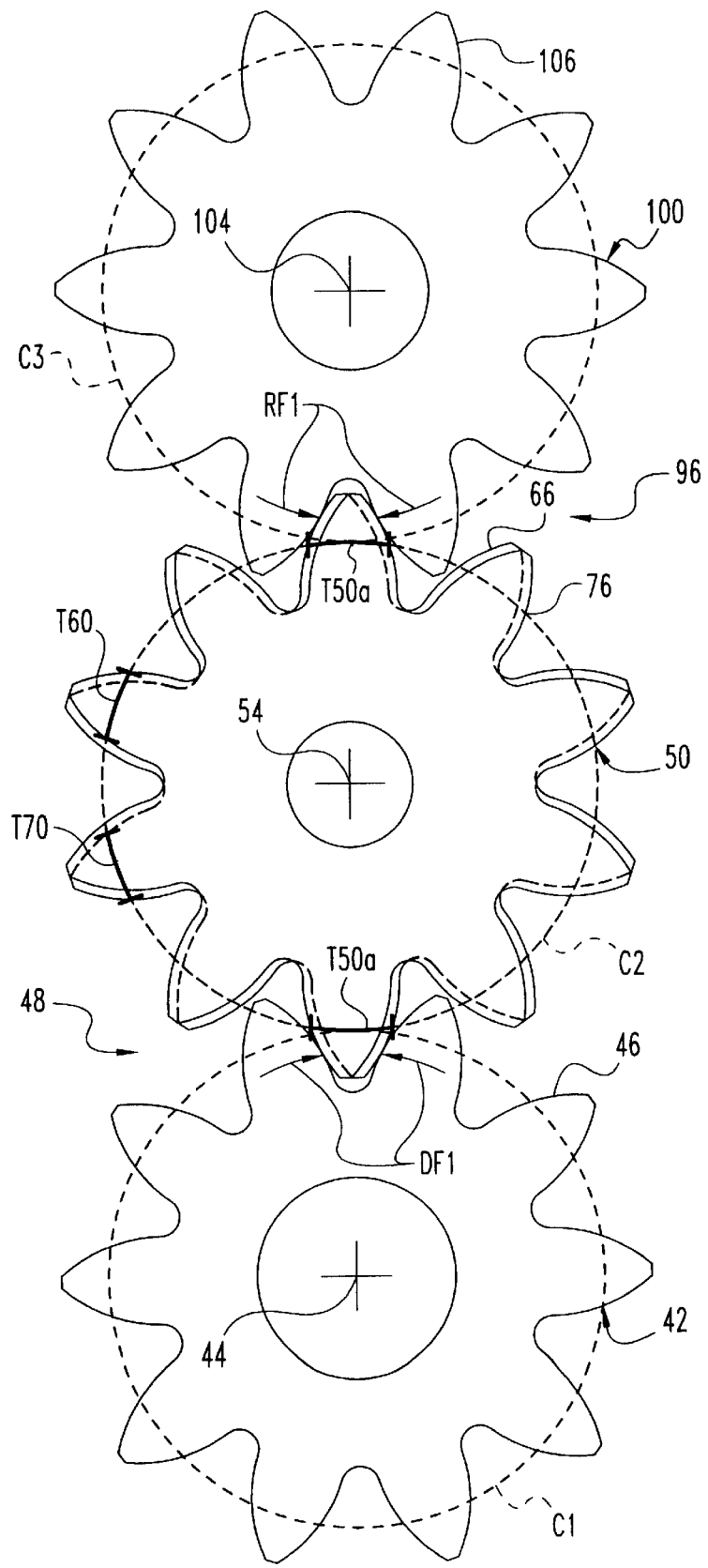
FIGS. 8A–8C are schematic, front elevational views depicting selected operational states of a portion of the system of FIG. 1.
Figure 8B:
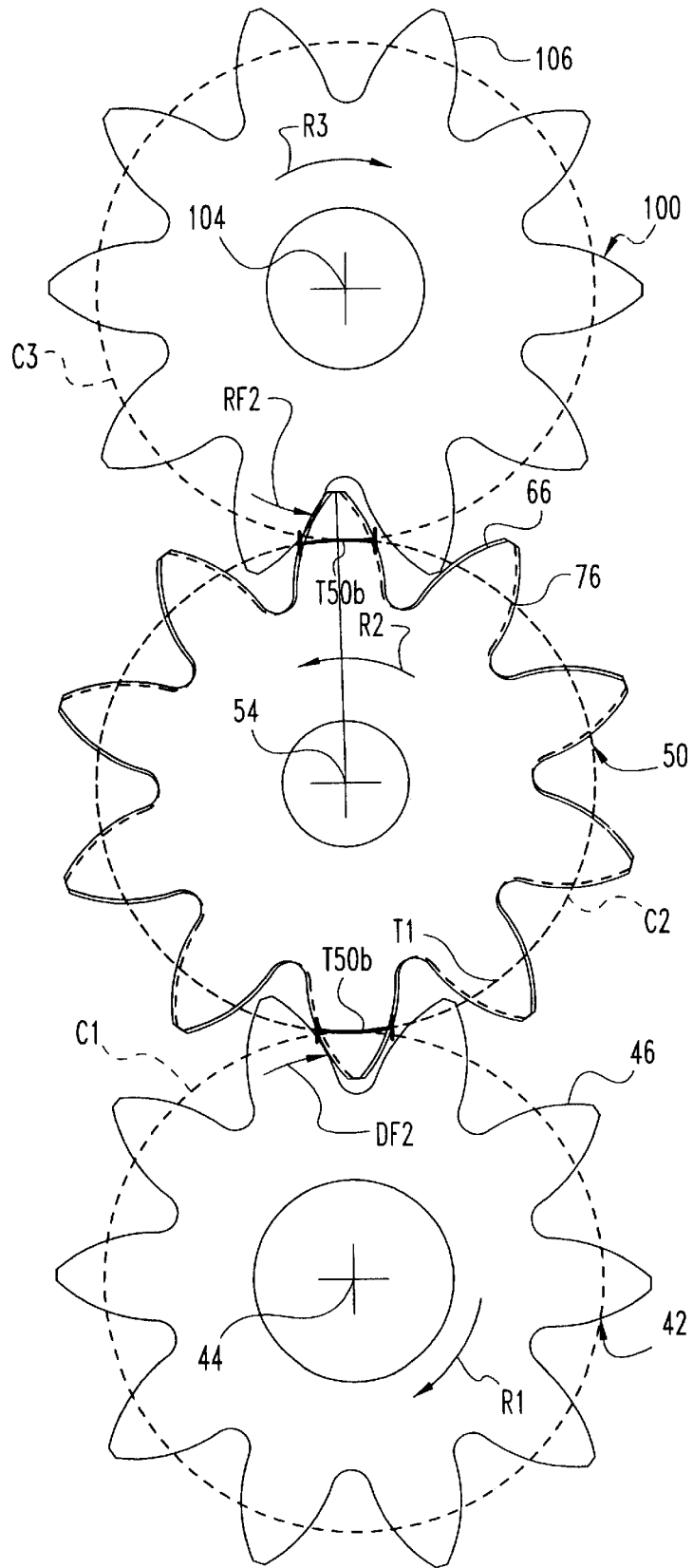
Figure 8C:
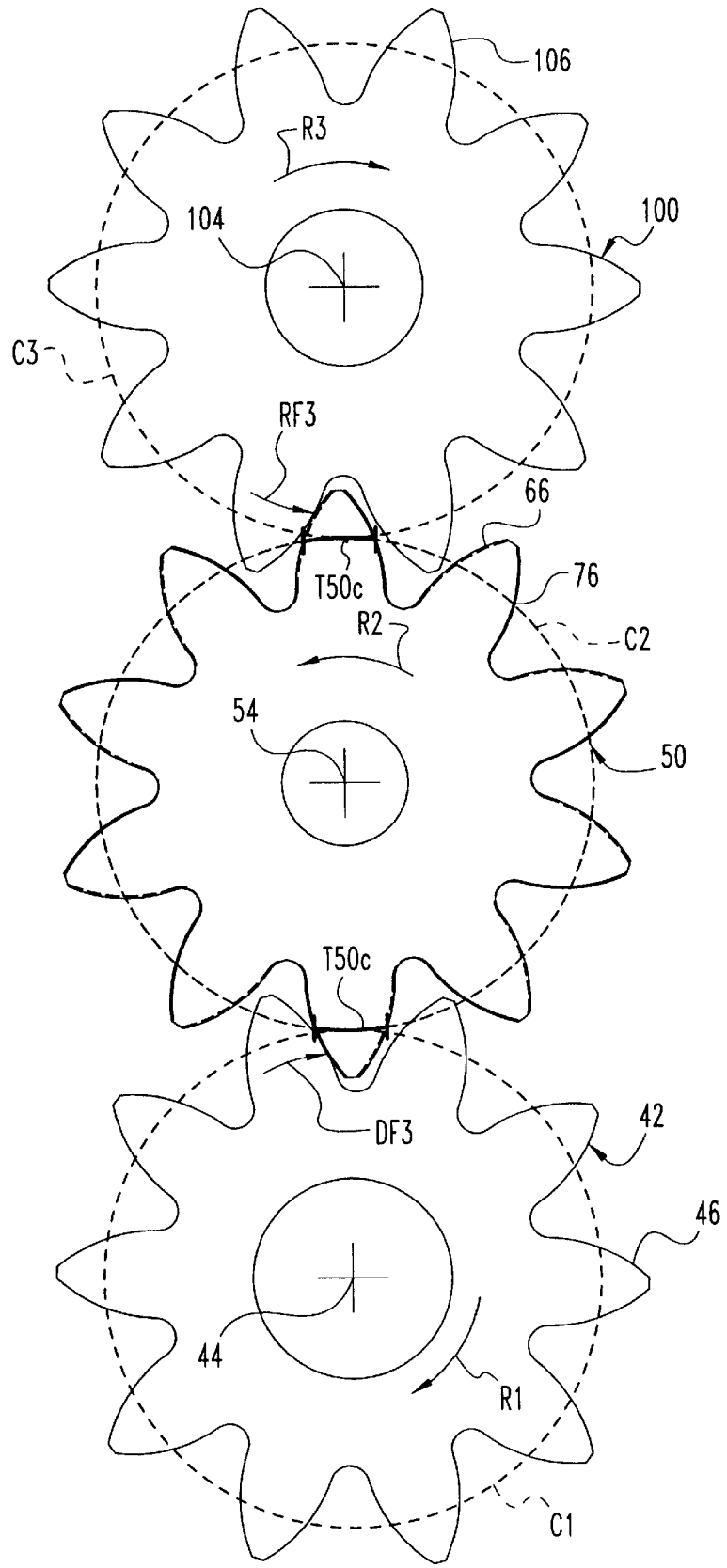

Referring to FIGS. 8A–8C, selected operational states of gears 42, 50, and 100 are schematically depicted with reference numerals representing structure designated by like numerals in FIGS. 1–6; however, fewer and larger teeth are schematically illustrated in these figures to emphasize various features. Referring to FIG. 8A, gears 42, 50, 100 are in a static (motionless) state relative to each other. Referring to mesh 48, imaginary pitch circles C1, C2, C3 are represented by dashed lines for gears 42, 50, 100, respectively. The circular thickness T50a of a pair of gear teeth 76, 66 of gear 50 is shown as an arc along the companion pitch circle C2. Arrows DF1 represent the forces counter-acting the bias of gear 50 for the depicted static condition in FIG. 8A. The static reaction forces of gear 100 are shown by arrows RF1. Also depicted is the circular thickness T60 of a selected tooth 66, and the circular thickness T70 of a selected tooth 76. It is preferred that circular thickness T60 be nominally less than circular thickness T70 for each tooth 60, 70, respectively. In one preferred embodiment, T60 is at least about two thousands (0.002) of an inch less than T70. More preferably, this difference is at least about four thousands (0.004) of an inch. Most preferably, this difference is in a range of about two to six thousands (0.002–0.006) of an inch.

In FIG. 8B, drive gear 42 is rotating in the direction indicated by arrow R1 to provide a resultant drive force represented by arrow DF2. In response, gear 50 is rotating in the direction indicated by arrow R2 and gear 100 is rotating in the direction indicated by arrow R3. The resultant reaction force presented by gear 100 is represented by arrow RF2. The resultant forces DF2 and RF2 are of sufficient intensity to partially overcome the spring bias, causing compression of springs 81 of gear 50. As a result, the circular thickness T50b of the composite pairs of teeth of gear 50 decreases relative to thickness T50a (T50b is less than T50a). As the magnitude of the force transmitted from drive gear 42 increases, gear teeth 66, 76 continue to approach alignment.

In FIG. 8C, the resultant driving force DF3 of gear 42 and reaction force RF3 of gear 100 compresses springs 81 by an amount sufficient to align gear teeth 66 and 76. When so aligned, composite thickness T50c results. T50c is less than both T50a and T50b, and is generally equal to the circular thickness T70 of teeth 76. Springs 81 are generally fully compressed in the FIG. 8C configuration; storing energy generally equivalent in amount to springs 81 in the configuration of FIG. 5.

The smaller circular thickness of teeth 66 compared to teeth 76 (T60 <T70) prevents loading of teeth 66 beyond the load provided by the compressed springs of FIG. 8C. In contrast, teeth 76 bear any load in excess of the spring load. Limiting the load on teeth 66 to the spring bias generally reduces reverse bending loads commonly resulting from random dimensional differences of tooth pairs having each member nominally sized to the same circular thickness. Preferably, the wider tooth face W70 of each tooth 76 is selected to bear the higher driving loads in excess of the spring bias; however, the total width increase (W60+W70) for gear 50 is typically less than the width increase required to withstand reverse bending loads by a scissor gear that has the same nominal circular thickness for all teeth.

Figure 9:
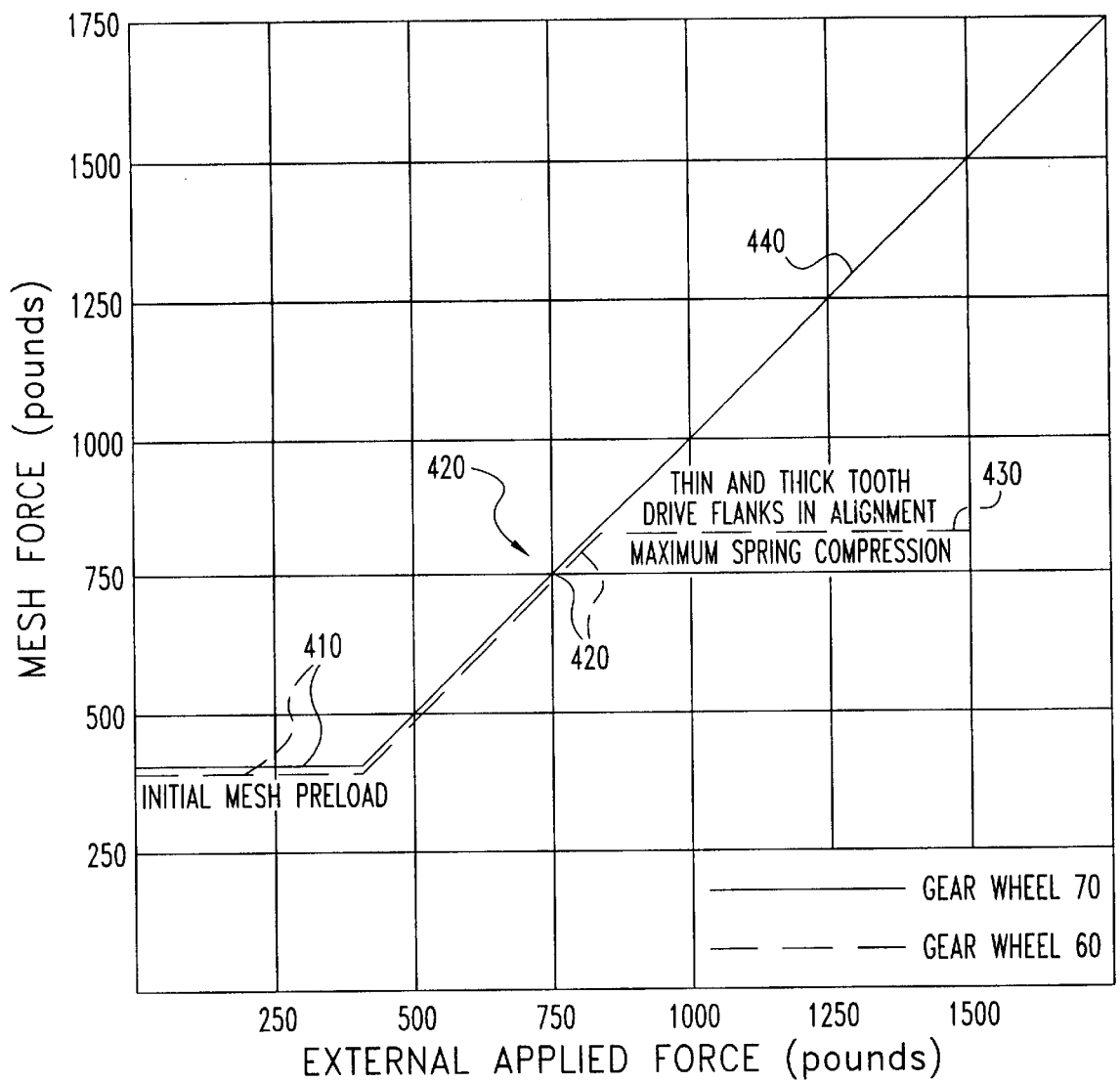
FIG. 9 is a graph illustrating various relationships concerning the operational states shown in FIGS. 8A–8C.

FIG. 9 graphically represents the typical effect of reduced circular thickness T60 compared to circular thickness T70 with load lines 400. The dashed line 400 represents gear wheel 60 and the solid line 400 represents gear wheel 70. Horizontal segments 410 correspond to the pre-loaded bias of gear 50 under the static conditions of FIG. 8A. Sloped segments 420 correspond to the loading of teeth 66, 76 between the static condition of FIG. 8A and the aligned position of FIG. 8C. FIG. 8B represents one point along segments 420. Once loading compresses springs 81 to align teeth as illustrated in FIG. 8C, the loading on teeth 66 of gear wheel 60 flattens to the maximum load of springs 81 as indicated by segment 430. At the same time, the thicker face W70 of teeth 76 bears the high intensity loading as indicated by sloped segment 440. By allowing wheel 70 to handle the high loads and limiting loading of wheel 60 with the circular thickness differential (T70–T60), reverse bending loads are typically reduced.

It has been found that much of the unpleasant noise, such as the "hammering" sounds associated with heavy-duty diesel engines, is due to high impact noise from gear trains associated with those engines. An unexpectedly dramatic change in sound quality is experienced, typically including a reduction in overall noise intensity, when a relatively high bias torque is provided by a scissor gear participating in the gear train. As used herein, "bias torque" is the magnitude of the torque provided by a spring-biased scissor gear assembly. The bias torque is determined as the magnitude of the cross product of the vectors corresponding to a radial distance from the rotational center of the gear to the teeth and the force acting tangential to a circle corresponding to the radius. Typically, the bias torque varies as a function of the amount of loading of the scissor gear bias. Preferably, the bias torque is at a maximum when the gear teeth are generally aligned in opposition to the bias. For the aligned configuration of teeth 66, 76 in FIG. 5, a radial vector T and a force vector F are illustrated which may be used to determine bias torque for assembly 58.

It has been found that a maximum bias torque of at least 100 foot-pounds (ft-lbs) provides improved gear train noise character and intensity. More preferably, a maximum bias torque of at least about 200 ft-lbs is provided. Most preferably, a maximum bias torque of at least about 500 ft-lbs is provided. In one most preferred embodiment, gear 50 is configured with a maximum bias torque of about 700 ft-lbs, and gear 200 is configured with a maximum bias torque of about 200 ft-lbs. In many instances, the bias torque of the present invention obviates the need to use expensive enclosures and panels to mute unpleasant noise.

Figure 10:
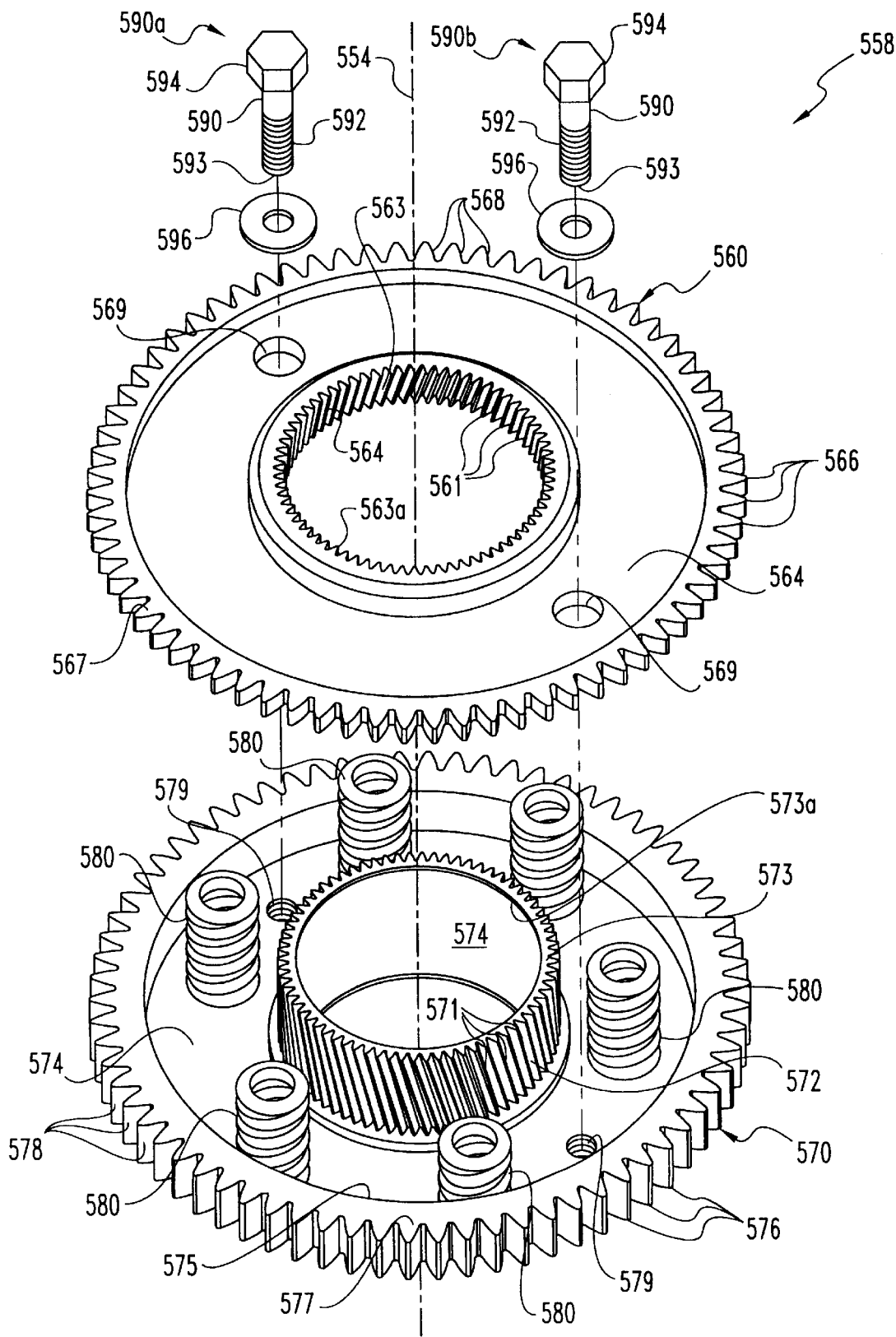
FIG. 10 is an exploded perspective view of an anti-lash gear assembly of an alternative embodiment of the present invention.

FIG. 10 provides an exploded perspective view of anti-lash gear assembly 558 about rotational center 554 of an alternative embodiment of the present invention. Assembly 558 includes gear wheel 560 with splines 561 defined by inner cylindrical surface 564 of hub 563. Hub 563 defines opening 563a therethrough. Splines 561 are of the helical type oriented about center 554 and inclined relative to the rotational axis of wheel 560. Hub 563 is integrally connected to web 564. A number of circumferentially disposed teeth 566 are defined by rim 567 which is also integrally connected to web 564. Teeth 566 are generally evenly spaced apart from each other about center 554 and each have generally the same size and shape. Between adjacent teeth 566 are gaps 568 which are also generally evenly spaced apart from one another and have generally the same shape and size. Web 564 of wheel 560 defines two opposing apertures 569 therethrough.

Assembly 558 also includes wheel 570. Wheel 570 includes splines 571 defined by cylindrical outer surface 572 of hub 573. Splines 561 are of the helical type oriented about center 554 and inclined relative to the rotational axis of wheel 570. Splines 571 are inclined in generally the same manner as splines 561 to mate therewith. Hub 573 is configured to fit within opening 563a of hub 563 to mate splines 561 and 571. Hub 573 defines opening 573a surrounded by inner cylindrical surface 574 for establishing a rotational bearing relationship with a mounting shaft. Wheel 570 also includes web 574 integrally connected to hub 573. Teeth 576 are defined by rim 577 which is integrally connected to web 574. Teeth 576 are generally evenly spaced apart from one another about rotational center 554 and each have generally the same size and shape. Teeth 576 define gaps 578 therebetween. Gaps 578 are generally evenly spaced apart from one another and each have generally the same size and shape. Collectively, hub 573, web 574, and rim 571 define a cylindrical recess 575. Web 564 defines two opposing threaded recesses 579 each corresponding to one of apertures 569.

Coil springs 580 are each placed in recess 575 and are generally evenly spaced apart from one another about center 554 between hub 573 and rim 577. Adjustment devices 590a, 590b are included which each have adjustment bolt 590 with threaded stem 592. Stem 592 has end 593 opposing head 594. Devices 590a, 590b each include washer 596 configured for passage of stem 592 therethrough. In contrast, head 594 is sized so that it will not pass through washer 596. Also, the outer diameter of washer 596 is dimensioned so that it will not pass through aperture 569. Aperture 569 is sized to provide ample clearance for stem 592, permitting selective positioning of stem 592 therein. Threaded recesses 579 are each configured for engagement by a corresponding one of stems 592.

Figure 11A:
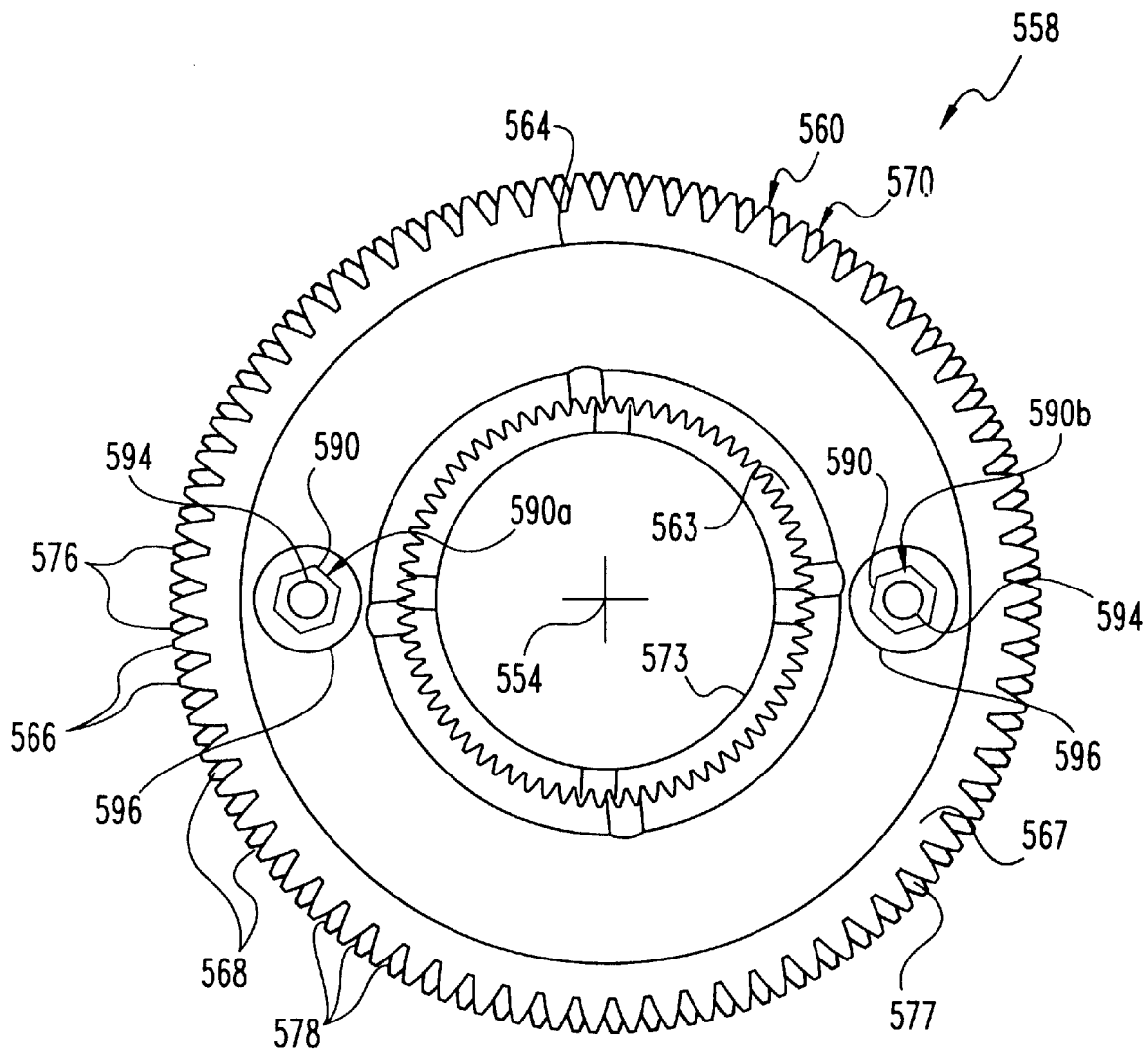
FIG. 11A is a top plan view of the anti-lash gear assembly of FIG. 10 in an unaligned configuration.
Figure 11B:
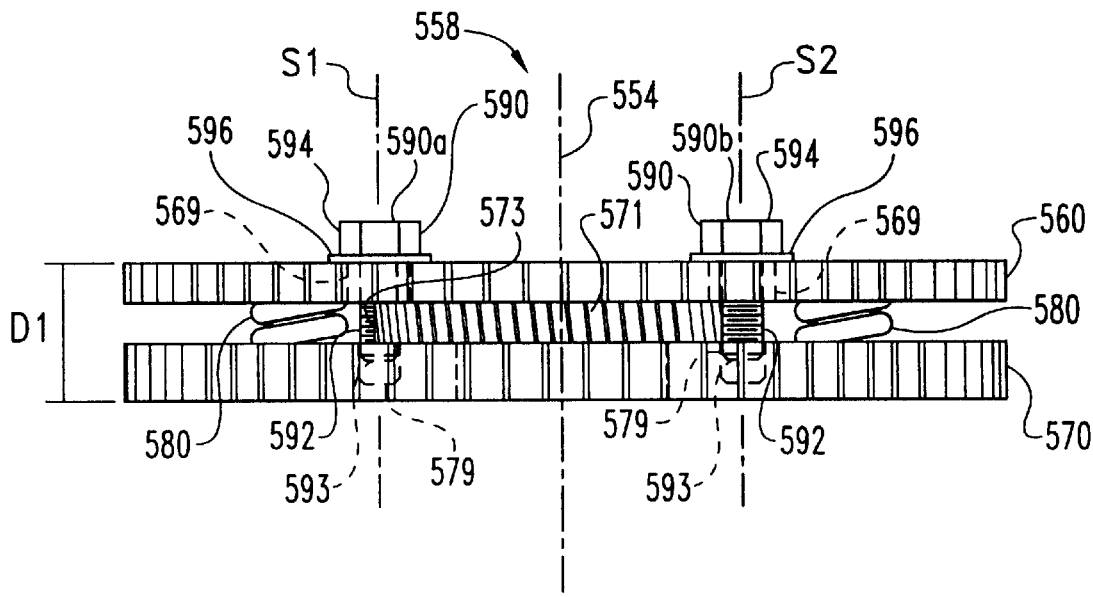
FIG. 11B is a side elevational view of the anti-lash gear assembly of FIG. 11A.

Referring to FIG. 11A, an unaligned position of assembly 558 is illustrated that shows teeth 566 and 576 of wheels 560 and 570, respectively, out of register similar to the embodiment illustrated in FIG. 4. Referring additionally to FIG. 11B, a side elevational view of assembly 558 in the unaligned configuration is illustrated. Splines 561 of wheel 560 engage splines 571 of wheel 570. For each device 590a, 590b, stems 592 have corresponding longitudinal stem axes S1, S2. Stems 592 are inserted through corresponding washers 596 and apertures 596 to initially engage a corresponding threaded recess 579. Springs 580 are not substantially compressed in the configuration of FIGS. 11A and 11B.

Figure 12B:
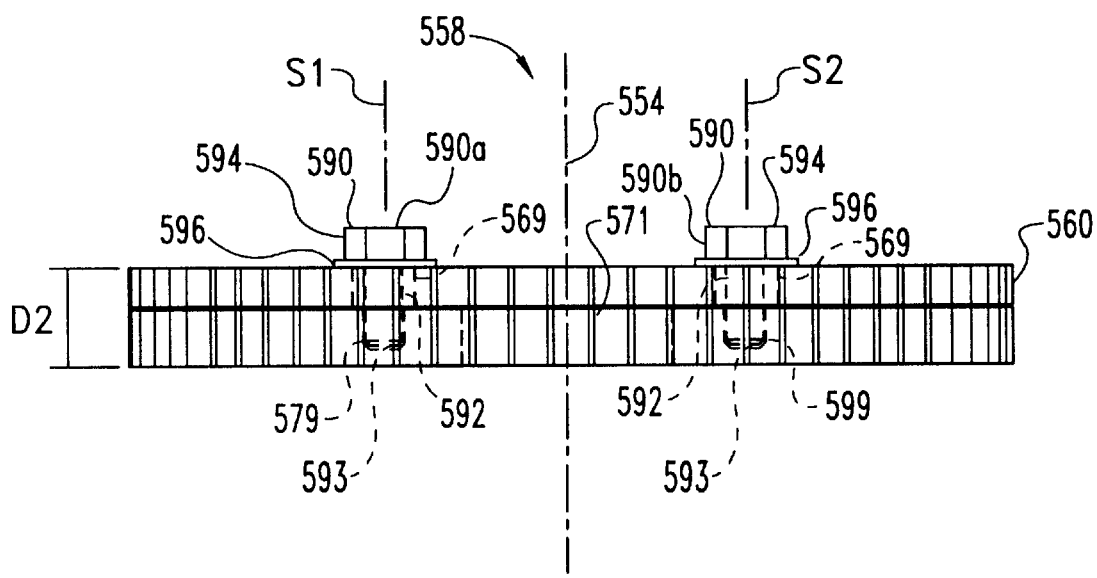
FIG. 12B is a side elevational view of the anti-lash gear assembly of FIG. 12A.
Figure 12A:
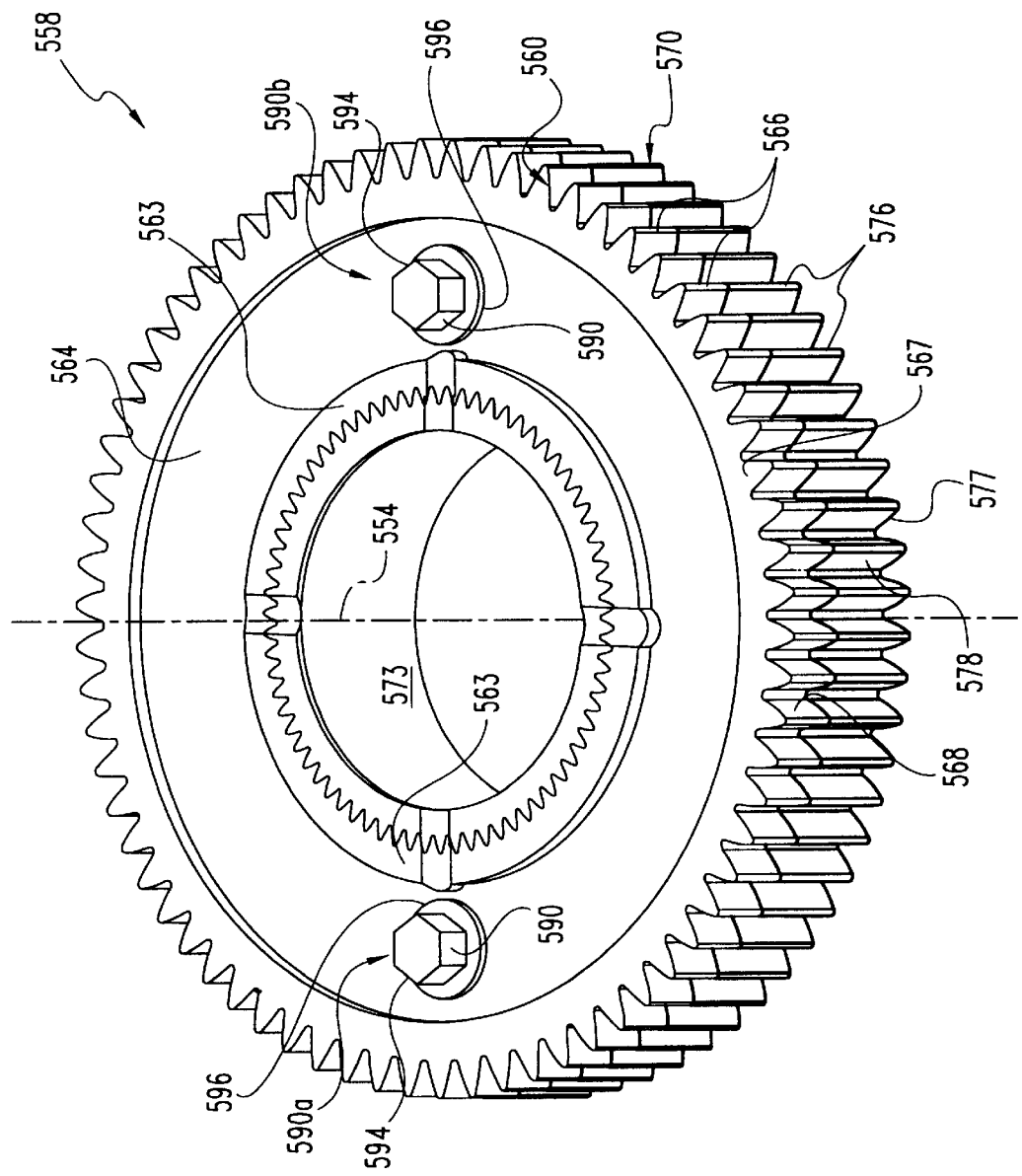
FIG. 12A is a top plan view of the anti-lash gear assembly of FIG. 10 in an aligned configuration.

Referring additionally to FIGS. 12A and 12B, a perspective view and a side elevational view of assembly 558 in an aligned configuration are illustrated, respectively. This aligned configuration generally corresponds to the aligned configuration of assembly 58 illustrated in FIG. 5. To provide alignment of assembly 558, stems 592 of adjustment devices 590a, 590b are further threaded into recesses 579 to compress springs 580 between wheel 560 and 570. As springs 580 are compressed, the inclines of mating splines 561, 571 provide a ramping action that generally converts the translational motion of devices 590a, 590b to a rotational motion of wheels 560, 570. As stems 592 of devices 590a, 590b are unthreaded, the compressed springs 580 provide a force which rotates wheels 560 and 570 in the opposite direction due to the engagement of splines 561, 571. Assembly 558 is configured so that teeth 566 and 576 are generally aligned when stems 592 are fully threaded into recesses 579. This aligned orientation of assembly 558 is also preferably configured to provide a selected maximum bias torque. The distance wheels 560 and 570 occupy along stem axes S1 and S2 changes from D1 for the unaligned position shown in FIG. 11B to D2 for the aligned position illustrated in FIG. 12B, where D1 is greater than D2. Notably, D2 is the minimum distance occupied by wheels 560, 570 of assembly 558 along stem axes S1, S2. Thus, wheels 560, 570 rotate relative to each other in accordance with the distance occupied by the wheels 560, 570 along the rotational axis corresponding to center 554.

Preferably, the number of teeth 566 is the same as the number of teeth 576. It is also preferred that the number of helical splines 561, 571 be the same as the number of teeth 566, 576, respectively. Identical quantities of teeth and splines simplifies assembly by avoiding the need to index splines 571, 561 to assure that alignment of teeth 566 and 576 coincides with high spring compression. In other embodiments, aperture 569 may be configured as a non-circular opening as opposed to the generally circular opening illustrated in FIG. 10. In one alternative embodiment, aperture 569 is configured as an arcuate slot with a bend radius extending from center 554.

Splines 561, 571 may be provided in different locations besides hubs 563, 573. By way of non-limiting example, arcuate slots defined by one wheel may have an inner surface defining splines configured to mate with splines defined by a flange extending from the other wheel into these slots. Notably, one or more segments of mating spines oriented about the rotational axis are capable of providing the relative rotation of the gear wheels without needing to encircle the axis.

Similar to the embodiment of assembly 58, assembly 558 provides an alignment device which provides for selectively aligning teeth of two gear wheels of an anti-lash gear assembly by opposing the spring bias of the assembly. Stems 592 are tightened down to provide the aligned configuration of FIGS. 12A and 12B for installation. Once assembly 558 is meshed with another gear, gear 42 for example, stem 592 of each device 590a, 590b is loosened to permit relative rotation of wheels 560 and 570 to take-up lash of the mating gear. This loosened position would appear similar to the configuration of FIGS. 11A and 11B, but would preferably provide clearance between head 594 and washer 596 of each bolt 590 to accommodate changing lash conditions of a corresponding mesh. In one embodiment, devices 590a, 590b are removed once assembly 558 is installed in a mesh with another gear. This embodiment relies on the mesh to oppose the bias.

Each assembly 58, 558 is configured with an adjustment device having a threaded stem coupled to one wheel that extends along a stem axis. These devices further include a head coupled to the stem and configured for adjustable positioning relative to the wheel. Generally, assemblies 58 and 558 may be configured to be interchangeable with regard to other features of the present invention. Furthermore, assembly 58 or 558 may be adapted for use with anti-lash gear 200. In other embodiments of assemblies 58, 558; bolts 90, 590 may be replaced by a threaded stem fixed to one of the wheels with a nut threaded thereon to provide a movable head. This nut is positioned along the stem to selectively engage the other wheel. In still other embodiments of the present invention, neither anti-lash assembly may be utilized. Indeed in some alternative embodiments of the present invention, a conventional scissor gear assembly may be employed.

FIGS. 13 and 14 depict adjustable idler gear mechanism 600a of the present invention. Mechanism 600a is illustrated as a substitute for idler gear 100 and mechanism 120 of system 20 with like reference numerals representing like features. Mechanism 600a includes gear 603a, mounting shaft 655a, and mounting plate 630a coupled to block 22 as previously described in connection with system 20. Gear 603a includes gear wheel 613a and mounting shaft 655a. Gear wheel 613a has rim 616a defining teeth 615a. Rim 616a is integrally connected to web 617a. Web 617a is integrally connected to hub 618a which engages cylindrical bushing 619a to provide a rotational bearing relationship in the manner as previously described for idler gear 100.

Mounting shaft 655a has positioning pin 601a protruding from mounting surface 667a. Pin 601a is shown engaging slot 602a defined by mounting surface 637a of mounting plate 630a. Mounting surfaces 667a and 637a are also shown in engagement. Pin 601a is fixed relative to shaft 655a and is generally centered relative to the rotational axis that coincides with rotational center 650a of gear 603a. Pin 601a may be an integral part of shaft 655a or connected thereto using any suitable means as would occur to those skilled in the art. Slot 602a follows a limited pathway represented by a line segment with the reference numeral 660a in FIG. 14. Collectively, pin 601a and slot 602a provide a guide 625a to position center 650a along pathway 660a. 660a may follow a generally straight path, as represented by the solid line segment, or alternatively, it may follow a curvilinear path 660a' as shown in exaggerated form by the dashed line segment of FIG. 14. Plate 630a is fixed relative to block 22 using any suitable means that would occur to those skilled in the art. The location of plate 630a is selected to provide a predetermined relationship of pathway 660a, 660a' relative to rotational center 54 of gear 50. In one preferred assembly process, rotational centers 54 and 204 of gears 50 and 200, respectively, are predetermined. Mounting plate 630a is positioned to establish that the distance separating rotational center 54 from any given point along pathway 660a stays within a predetermined range. This range corresponds to an acceptable range of backlash variation between gears 50 and 603a as more fully described hereinafter. After gears 50 and 200 are mounted, gear 603a is positioned to adjustably intermesh therewith and pin 601a is received in slot 602a. Pin 601a slidingly engages slot 602a to provide guide 625a, and thereby facilitate adjustment of rotational center 650a of gear 603a along pathway 660a. For any position of pin 601a along slot 602a, the spacing between rotational centers 54 and 650a is maintained to provide an acceptable minimal degree of backlash for the mesh between gears 603a and 50 in accordance with the predetermined spatial relationship between pathway 660a and rotational center 54. For the generally straight pathway configuration designated by reference numeral 660a, it is preferred to orient pathway 660a to be approximately parallel to tangent line 610a; where line 610a is tangent to pitch circle 612a for gear 50 and pitch circle 614a for gear 603a. This orientation generally minimizes the amount of backlash variation between gear 50 and gear 603a as pin 601a is moved along pathway 660a.

Further, this technique of determining the position of assembly 600a relative to gears 50, 200 is less prone to error, being more "foolproof" than existing methods to minimize backlash of two or more meshes of the same gear. Also, the structure of guide 625a is less complicated and time consuming to adjust compared to conventional approaches.

Typically, it is easier to manufacture guide 625a to define a generally straight pathway 660a than a predetermined curved pathway 660a'; however, the degree of accuracy available when matching the backlash of the meshes of both gears 50 and 200 may be generally less for pathway 660a than curved path 660a'. Thus, in an alternative preferred embodiment, slot 602a follows curved pathway 660a'. The curvature of pathway 660a' is preferably selected to provide generally constant spacing from rotational center 54 as pin 601a is moved therealong. For this preferred embodiment, pathway 660a' has a generally constant radius of curvature originating from rotational center 54, such that pathway 660a' is a concentric arc relative to pitch circle 612a of gear 50.

Pathways 660a and 660a' are also oriented to provide a substantially greater degree of spacing variation and corresponding backlash variation with respect to gear 200. Therefore, pin 601a may be moved along pathway 660a or 660a' to determine a position which minimizes backlash between gear 200 and 603a while not exceeding a desired level of backlash between gear 50 and 603a. Once a position is selected, shaft 655a is fixed relative to mounting plate 630a and block 22. This fixation may be accomplished with one or more fasteners, such as with bolts, screws, or rivets; a bonding process, such as soldering, brazing, welding, or adhesively joining; or through such other means as would occur to one skilled in the art. In another embodiment, pin 601a protrudes from the plate 630a and the slot 602a is defined by the shaft 655a to provide guide 625a with comparable adjustment capability.

FIGS. 15 and 16 depict another idler gear adjustment mechanism 600b of the present invention. Mechanism 600b is illustrated as a substitute for idler gear 100 and mechanism 120 of system 20 with like reference numerals representing like features. Mechanism 600b includes gear 603b, mounting shaft 655b, and mounting plate 630b coupled to block 22 as previously described in connection with system 20. Gear 603b includes gear wheel 613a, as described in connection with mechanism 600a. Likewise, gear 603b includes cylindrical bushing 619b to provide a rotational bearing relationship between gear wheel 613a and shaft 655b.

Adjustment mechanism 600b has a guide 625b including positioning pins 601b and slot 609b. Mounting shaft 655b has two positioning pins 601b protruding from mounting surface 667b. Pins 601b are shown engaging slot 609b defined by mounting surface 637b of mounting plate 630b. Mounting surfaces 667b and 637b are also shown in engagement. Pins 601b are fixed relative to shaft 655b in an off-center relationship relative to the rotational axis that coincides with rotational center 650b of gear 603b. Pins 601b may be an integral part of shaft 655b or connected thereto using any suitable means as would occur to those skilled in the art. Slot 609b follows a limited pathway represented by a line segment with the reference numeral 660b in FIG. 16. Plate 630b is fixed relative to block 22 using any suitable means that would occur to those skilled in the art.

In one preferred assembly process, plate 630b is mounted to block 22 to establish a predetermined spatial relationship between pathway 660b and rotational center 54 of gear 50. Gear 603b is mounted to adjustably intermesh with gears 50 and 200 by slidingly engaging pins 601b in slot 609b. For any position of pins 601b along slot 609b, the spacing between rotational centers 54 and 650b is maintained to provide an acceptable minimal degree of backlash for the mesh between gears 603b and 50 in accordance with the predetermined spatial relationship between pathway 660b and rotational center 54. For the illustrated embodiment, pathway 660b is represented by a generally straight segment that is generally parallel to tangent line 610b; where line 610b is tangent to pitch circle 612b for gear 50 and pitch circle 614b for gear 603b. In an alternative embodiment, pathway 660b' is represented by a dashed line, and is curved and configured in the manner described in connection with pathway 660a' of mechanism 600a. The curvature is exaggerated to more clearly depict pathway 660b'.

Pathway 660b is also oriented to provide a substantially greater degree of spacing variation and corresponding backlash variation with respect to gear 200. Therefore, pins 601b may be moved along pathway 660b to determine a position which minimizes backlash between gear 200 and 603b while not exceeding a desired level of backlash between gears 50 and 603b. Once a position is selected, shaft 655b is fixed relative to mounting plate 630b and block 22 in a manner comparable to that described for plate 630a.

FIGS. 17 and 18 depict another idler gear adjustment mechanism 600c of the present invention. Mechanism 600c is illustrated as a substitute for idler gear 100 and mechanism 120 of system 20 with like reference numerals representing like features. Mechanism 600c includes gear 603c, mounting shaft 655c, and mounting plate 630c that have been coupled to block 22 previously described in connection with system 20. Gear 603c includes gear wheel 613a described in connection with mechanism 600a. Likewise, gear 603c includes cylindrical bushing 619c to provide a rotational bearing relationship between gear wheel 613c and shaft 655c.

Adjustment mechanism 600c has a guide 625c including pins 601c and shoulder 604c. Mounting plate 630c has two positioning pins 601c protruding from mounting surface 637c. Pins 601c are shown engaging guide shoulder 604c defined by mounting surface 667c of shaft 655c. Mounting surfaces 667c and 637c are also shown in engagement. Pins 601c are fixed relative to plate 630c in an off-center relationship relative to the rotational axis that coincides with rotational center 650c of gear 603c. Pins 601c may be an integral part of plate 630c or connected thereto using any suitable means as would occur to those skilled in the art. Shoulder 604c follows a pathway represented by a line segment with the reference numeral 660c in FIG. 18. Plate 630c is fixed relative to block 22 using any suitable means that would occur to those skilled in the art.

In one preferred assembly process, plate 630c is mounted to block 22 to establish a predetermined spatial relationship between pathway 660c and rotational center 54 of gear 50. Gear 603c is mounted to adjustably intermesh with gears 50 and 200 by sliding pins 601c against shoulder 604c. For any position of pins 601c along shoulder 604c, the spacing between rotational centers 54 and 650c is maintained to provide an acceptable minimal degree of backlash for the mesh between gears 603c and 50 in accordance with the predetermined spatial relationship between pathway 660c and rotational center 54. For the illustrated embodiment, pathway 660c is represented by a generally straight segment that is generally parallel to tangent line 610c; where line 610c is tangent to pitch circle 612c for gear 50 and pitch circle 614c for gear 603c. In an alternative embodiment, curved pathway 660c' may be utilized as represented by the dashed line in FIG. 18. Preferably, pathway 660c' is curved in the manner described for pathway 660a' of the mechanism 600a. The curvature of pathway 660c' is exaggerated to more clearly depict it in FIG. 18.

Pathway 660c is also oriented to provide a substantially greater degree of spacing variation and corresponding backlash variation with respect to gear 200. Therefore, pins 601c may be moved along pathway 660c to determine a position which minimizes backlash between gear 200 and gear 603c while not exceeding a desired level of backlash between gear 50 and gear 603c. Once a position is selected, shaft 655c is fixed relative to mounting plate 630c and block 22 in a manner comparable to that described for plate 630a.

Figure 20:
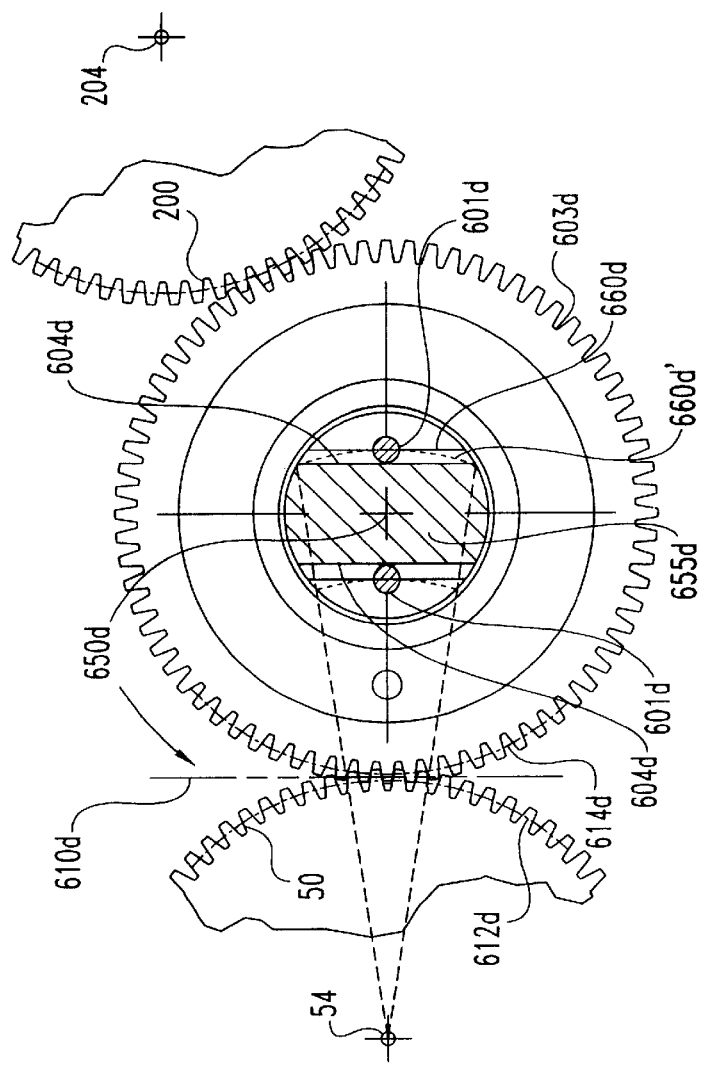
FIG. 20 is a cross-sectional view of the gear adjustment mechanism of FIG. 19 taken through section line 20—20.
Figure 19:
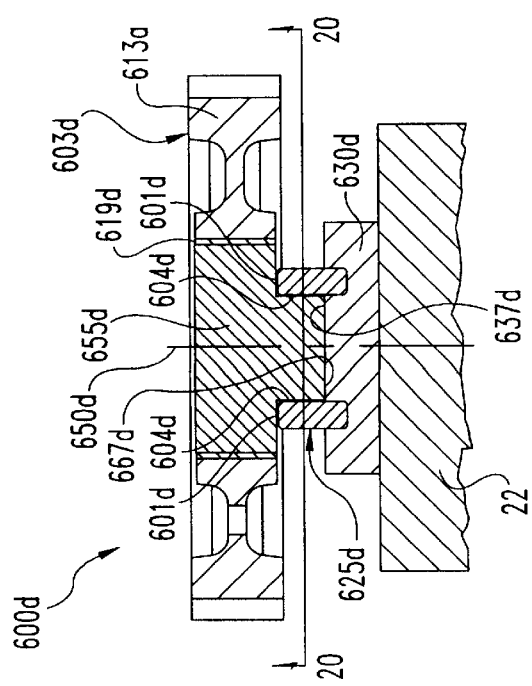
FIG. 19 is a section view of a fifth embodiment of the gear adjustment mechanism of the present invention.

FIGS. 19 and 20 depict another idler gear adjustment mechanism 600d of the present invention. Mechanism 600d is illustrated as a substitute for idler gear 100 and mechanism 120 of system 20 with like reference numerals representing like features. Mechanism 600d includes gear 603d, mounting shaft 655d, and mounting plate 630d that have been coupled to block 22 previously described in connection with system 20. Gear 603d includes gear wheel 613a described in connection with mechanism 600a. Likewise, gear 603d includes cylindrical bushing 619d to provide a rotational bearing relationship between gear wheel 613a and shaft 655d.

Adjustment mechanism 600d has a guide 625d including positioning pins 601d and guide walls 604d. Mounting plate 630d has two positioning pins 601d projecting from mounting surface 637d that are oppositely disposed relative to rotational center 650d. Pins 601d each engage a corresponding one of a pair of guide walls 604d defined by surface 667d of shaft 655d. Guide walls 604d are generally parallel to each other and are generally opposite each other. Surfaces 667d and 637d are also shown in engagement. Pins 601d are fixed relative to plate 630d in a generally symmetric relationship about rotational center 650d of gear 603d. Pins 601d may be an integral part of plate 630d or connected thereto using any suitable means as would occur to those skilled in the art. Walls 604d generally correspond to a pathway represented by a line segment with the reference numeral 660d in FIG. 20. Plate 630d is fixed relative to block 22 using any suitable means that would occur to those skilled in the art.

In one preferred assembly process, plate 630d is mounted to block 22 to establish a predetermined spatial relationship between pathway 660d and rotational center 54 of gear 50. Gear 603d is mounted to adjustably mesh with gears 50 and 200 by sliding each pin 601d against a corresponding wall 604d. For any position of pins 601d along walls 604d, the spacing between rotational centers 54 and 650d is maintained to provide an acceptable minimal degree of backlash for the mesh between gears 603d and 50 in accordance with the predetermined spatial relationship between pathway 660d and rotational center 54. For the illustrated embodiment, pathway 660d is represented by a generally straight segment that is generally parallel to tangent line 610d; where line 610d is tangent to pitch circle 612d for gear 50 and pitch circle 610d for gear 603d. In an alternative embodiment, the pathway is represented by a dashed line in FIG. 20 with reference numeral 660d' and is curved in the manner described in connection with pathway 660a' of mechanism 600a. The curvature of pathway 660d' is exaggerated in FIG. 20 to more clearly depict it.

Pathway 660d is also oriented to provide a substantially greater degree of spacing variation and corresponding backlash variation with respect to gear 200. Therefore, pins 601d may be moved along pathway 660d to determine a position which minimizes backlash between gear 200 and gear 603d while not exceeding a desired level of backlash between gear 50 and gear 603d. Once a position is selected, shaft 655d is fixed relative to mounting plate 630d and block 22 in a manner comparable to that described for plate 630a.

Figure 22:
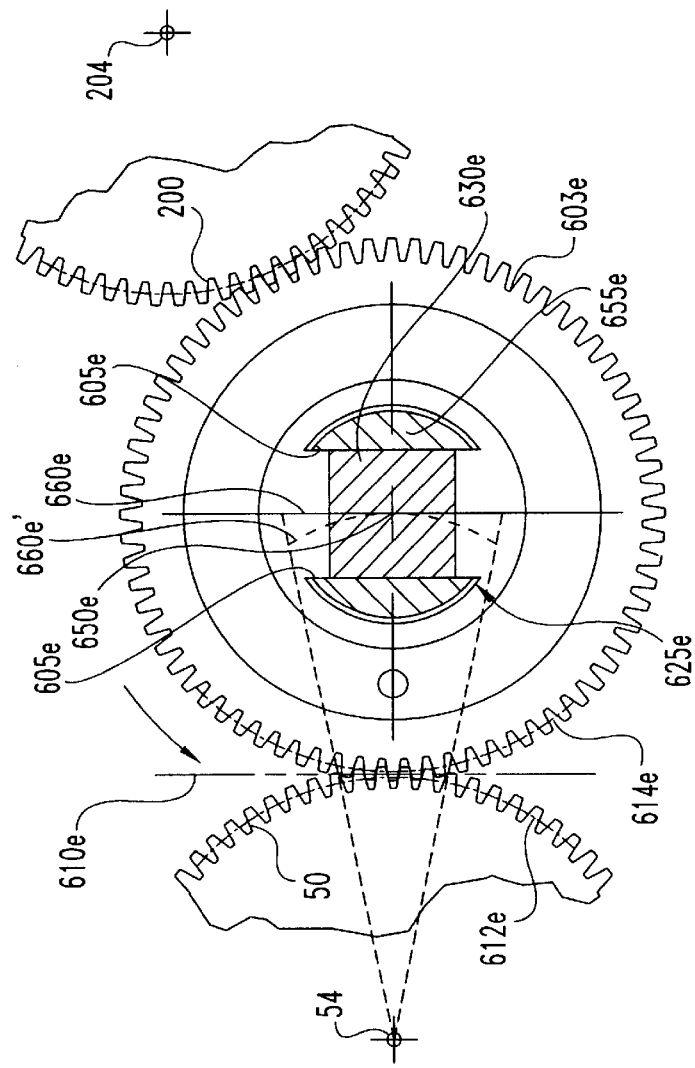
FIG. 22 is a cross-sectional view of the gear adjustment mechanism of FIG. 21 taken through section line 22—22.
Figure 21:
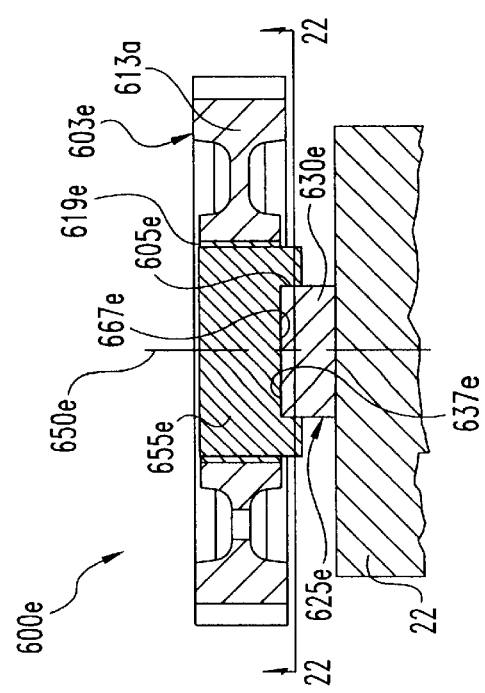
FIG. 21 is a section view of a sixth embodiment of the gear adjustment mechanism of the present invention.

FIGS. 21 and 22 depict another idler gear adjustment mechanism 600e of the present invention. Mechanism 600e is illustrated as a substitute for idler gear 100 and mechanism 120 of system 20 with like reference numerals representing like features. Mechanism 600e includes gear 603e, mounting shaft 655e, and mounting rail 630e coupled to block 22 as previously described in connection with system 20. Gear 603e includes gear wheel 613a as described in connection with mechanism 600a. Likewise, gear 603e includes cylindrical bushing 619e to provide a rotational bearing relationship between gear wheel 613a and shaft 655e.

Adjustment mechanism 600e has guide 625e including a channel 605e and rail 630e. Shaft 655e has mounting surface 667e that defines channel 605e. Channel 605e receives rail 630e therein, engaging mounting surface 637e of rail 630e with surface 667e. Channel 605e generally corresponds to a pathway represented by a line segment with the reference numeral 660e in FIG. 22. Rail 630e is fixed relative to block 22 using any suitable means that would occur to those skilled in the art.

In one preferred assembly process, rail 630e is mounted to establish a predetermined spatial relationship between pathway 660e and rotational center 54 of gear 50. Gear 603e is adjustably mounted to mesh with gears 50 and 200 by slidingly engaging rail 630e in channel 605e. For any position of rail 630e in channel 605e, the spacing between rotational centers 54 and 650e is maintained to provide an acceptable minimal degree of backlash for the mesh between gears 603e and 50 in accordance with the predetermined spatial relationship between pathway 660e and rotational center 54. For the illustrated embodiment, pathway 660e is represented by a generally straight segment that is generally parallel to tangent line 610e; where line 610e is tangent to pitch circle 612e for gear 50 and pitch circle 614e for gear 603e. In an alternative embodiment, the pathway is represented by the dashed line in FIG. 22 with reference numeral 660e'; and is curved in the manner described in connection with pathway 660a' of mechanism 600a. The curvature of pathway 660e' is exaggerated in FIG. 22 to more clearly depict it.

Pathway 660e is also oriented to provide a substantially greater degree of spacing variation and corresponding backlash variation with respect to gear 200. Therefore, rail 630e may be moved along channel 605e to determine a position which minimizes backlash between gear 200 and gear 603e while not exceeding a desired level of backlash between gear 50 and gear 603e. Once a position is selected, shaft 655e is fixed relative to rail 630e and block 22 in a manner comparable to that described for plate 630a.

Figure 24:
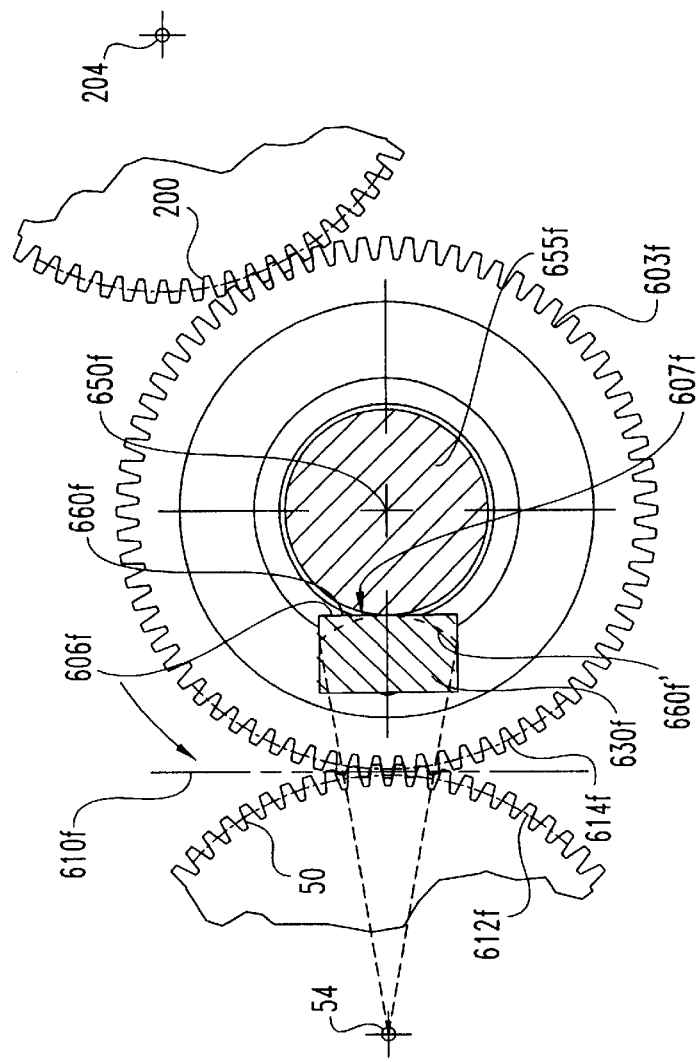
FIG. 24 is a cross-sectional view of the gear adjustment mechanism of FIG. 23 taken through section line 24—24.
Figure 23:
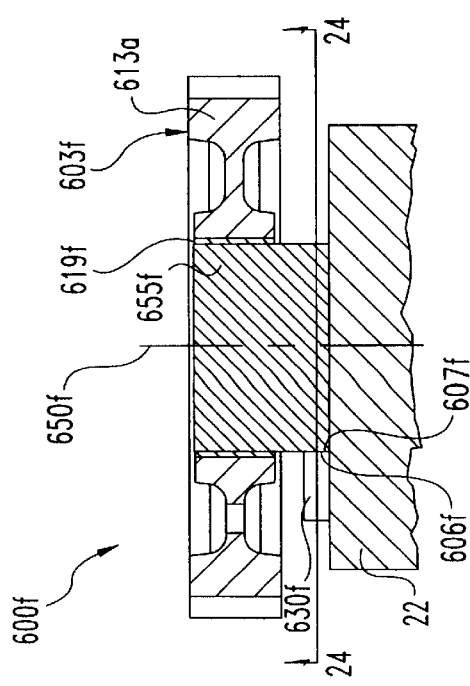
FIG. 23 is a section view of a seventh embodiment of the gear adjustment mechanism of the present invention.

FIGS. 23 and 24 depict another idler gear adjustment mechanism 600f of the present invention. Mechanism 600f is illustrated as a substitute for idler gear 100 and mechanism 120 of system 20 with like reference numerals representing like features. Mechanism 600f includes gear 603f, mounting shaft 655f, and guide plate 630f that have been coupled to block 22 previously described in connection with system 20. Gear 603f includes gear wheel 613a described in connection with mechanism 600a. Likewise, gear 603f includes cylindrical bushing 619f to provide a rotational bearing relationship between gear wheel 613a and shaft 655f.

Shaft 655f has mounting surface 607f engaging a cheek 606f of plate 630f. Cheek 606f generally extends along a pathway represented by a line segment with the reference numeral 660f in FIG. 24. Plate 630f is fixed relative to block 22 using any suitable means that would occur to those skilled in the art.

In one preferred assembly process, plate 630f is mounted to establish a predetermined spatial relationship between pathway 660f and rotational center 54 of gear 50. Gear 603f is adjustably mounted to mesh with gears 50 and 200 by engaging mounting surface 607f of shaft 655f against cheek 606f in a sliding or rolling relationship. For any position of shaft 655f along cheek 606f, the spacing between rotational centers 54 and 650f is maintained to provide an acceptable minimal degree of backlash for the mesh between gears 603f and 50 in accordance with the predetermined spatial relationship between pathway 660f and rotational center 54. For the illustrated embodiment, pathway 660f is represented by a generally straight segment that is generally parallel to tangent line 610f; where line 610f is tangent to pitch circle 612f for gear 50 and pitch circle 614f for gear 603f. In an alternative embodiment, the pathway is represented by a dashed line in FIG. 24 with reference numeral 660f'; and is curved in the manner described in connection with pathway 660a' of mechanism 600a. The curvature of pathway 660f' is exaggerated in FIG. 24 to more clearly depict it.

Pathway 660f is also oriented to provide a substantially greater degree of spacing variation and corresponding backlash variation with respect to gear 200. Therefore, shaft 655f may be moved along cheek 606f to determine a position which minimizes backlash between gear 200 and gear 603f while not exceeding a desired level of backlash between gear 50 and gear 603f. Once a position is selected, shaft 655f is fixed relative to plate 630f and block 22 in a manner comparable to that described for plate 630a.

It should be understood that additional gears and different gear types may be used with mechanisms 600a, 600b, 600c, 600d, 600e, 600f (collectively designated mechanisms 600) as would occur to those skilled in the art. Moreover, various guide pathways may be established relative to center 204 instead of 54 with a corresponding change in backlash adjustability. Further, it should be appreciated that the various pins of mechanisms 600 may be joined by a bonding process, such as soldering, brazing, welding; by adhesive application; by threading, by a press-fit connection, or through such other means as would occur to those skilled in the art. The pins are preferably cylindrical in shape, but other embodiments may include pins with a different shape. Also various other guide members, such as slots, shoulders, walls, and channels, of mechanisms 600 may be machined, casted, or formed using techniques known to those skilled in the art. Preferably, all parts for mechanisms 600 are made from a metal or composite material suitable for heavy-duty diesel engine applications.

It should also be appreciated that each mechanism 600 facilitates assembly of a gear train with minimized backlash by constraining backlash variation between the idler gear and gear 54 to an acceptable level, and yet permitting generally independent adjustments to reduce backlash with gear 200. This feature makes it unnecessary to precision mount gear 200 and thus improve assembly effectiveness in terms of time and cost. Moreover, backlash reduction in accordance with the present invention generally provides a quieter, longer lasting gear train.

All publications, patents, and patent applications cited in this specification are herein incorporated by reference as if each individual publication, patent, or patent application was specifically and individually indicated to be incorporated by reference and set forth in its entirety herein.

While the invention has been illustrated and described in detail in the drawings and foregoing description, the same is to be considered as illustrative and not restrictive in character, it being understood that only the preferred embodiment has been shown and described and that all changes, modifications, and equivalents that come within the spirit of the invention as defined by the following claims are desired to be protected.

What is claimed is:

1. A gear train assembly for an engine, comprising:
    (a) a first scissor gear rotatably coupled to the engine, said first scissor gear having a first rotational center;
    (b) a second scissor gear rotatably coupled to the engine, said second scissor gear having a second rotational center; and
    (c) an adjustable idler gear mechanism rotatably coupled to the engine, said mechanism including an idler gear forming a first mesh with said first scissor gear and a second mesh with said second scissor gear, said idler gear having a third rotational center, said mechanism including a guide defining a linear pathway for slidable adjustment of said third rotational center therealong, said pathway having a predetermined spatial relationship with said first rotational center to keep backlash between said first scissor gear and said idler gear at a predetermined minimum for a range of positions of said third rotational center along said pathway, said range of positions simultaneously providing a substantially greater range of backlash adjustment between said idler gear and said second scissor gear.

2. The assembly of claim 1, wherein said guide includes a pin and a slot, said slot defining said pathway and said pin slidingly engaging said slot.

3. The assembly of claim 1, wherein said pathway is generally straight.

4. The assembly of claim 1, wherein said guide includes a pair of guide walls defining said pathway, and a pair of pins each slidingly engaging a corresponding one of said walls.

5. The assembly of claim 1, wherein said mechanism includes a guide shoulder defining said pathway and a pair of pins engaging said shoulder.

6. The assembly of claim 1, wherein said mechanism includes a pin centered about a rotational axis corresponding to said third rotational center.

7. The assembly of claim 1, wherein said mechanism includes a shaft engaging a cheek of a mounting plate.

8. The assembly of claim 1, wherein said idler gear includes a shaft defining a channel and said mechanism includes a rail engaging said channel.

9. The assembly of claim 1, wherein said pathway is generally curvilinear.

10. A method of assembling a gear train, comprising:
    (a) mounting a first scissor gear;
    (b) mounting a second scissor gear;

(c) providing an idler gear to form a first mesh with the first scissor gear and a second mesh with the second scissor gear;

(d) moving the idler gear along a generally linear adjustment path defined by a mounting guide coupled to the idler gear, the linear adjustment path having a predetermined relationship to a rotational center of the first scissor gear to maintain a minimum backlash of the first mesh; and (e) mounting the idler gear in a position along the linear adjustment path after said moving, the position being selected to generally minimize backlash of the second mesh while maintaining the minimum backlash of the first mesh.

11. The method of claim 10, wherein the path is generally curvilinear.

12. The method of claim 11, wherein the path is generally straight.

13. The method of claim 10, wherein said moving includes selectively positioning the idler gear along the adjustment path by sliding a pin disposed within a slot.

14. The method of claim 10, wherein said moving the idler gear further includes selectively positioning the third gear along the adjustment path by sliding at least two pins along a shoulder.

15. The method of claim 10, wherein said moving the idler gear includes selectively positioning the idler gear along the adjustment path by sliding a channel along an adjustment rail.

16. The method of claim 10, wherein said moving the idler gear includes selectively positioning the idler gear along the adjustment path by rolling a shaft of the mounting guide along a cheek of an adjustment plate.

17. The method of claim 10, wherein said moving the idler gear includes selectively positioning the idler gear along the adjustment path by sliding a pair of pins oppositely disposed about a rotational center of the idler gear along a pair of corresponding guide walls.

18. A gear train assembly for an engine, comprising:

(a) a first scissor gear rotatably coupled to the engine, said first gear having a first rotational center;

(b) a second scissor gear rotatably coupled to the engine, said second gear having a second rotational center; and (c) an idler gear rotatably coupled to the engine to form a first mesh with said first gear and a second mesh with said second gear, said idler gear having a third rotational center and including a guide means for positioning said third gear along a generally linear adjustment path, said idler gear being selectively positionable along said path to maintain a distance between said first and third rotational centers within a predetermined range corresponding to a generally minimized backlash for said first mesh and to provide a correspondingly adjustable separation distance range between said second and third rotational centers to generally match backlash of said second mesh to said minimized backlash of said first mesh.

19. The gear train assembly of claim 18, wherein said path is generally in the form of an arc that is equidistant from the first rotational center.

20. The gear train assembly of claim 19, wherein said path is generally straight.

21. The gear train assembly of claim 19, wherein said guide means includes at least one pin.

* * * * *